United States Patent
Meylan et al.

(10) Patent No.: US 8,274,956 B2
(45) Date of Patent: Sep. 25, 2012

(54) STANDBY TIME IMPROVEMENTS USING SUB-NETWORKS

(75) Inventors: Arnaud Meylan, San Diego, CA (US); Manoj M. Deshpande, San Diego, CA (US); Sanjiv Nanda, Ramona, CA (US)

(73) Assignee: Qualcomm Incorporated, San Diego, CA (US)

( * ) Notice: Subject to any disclaimer, the term of this patent is extended or adjusted under 35 U.S.C. 154(b) by 487 days.

(21) Appl. No.: 11/680,400

(22) Filed: Feb. 28, 2007

(65) Prior Publication Data

US 2008/0002692 A1 Jan. 3, 2008

Related U.S. Application Data

(60) Provisional application No. 60/817,679, filed on Jun. 30, 2006.

(51) Int. Cl.
*H04W 4/00* (2009.01)
(52) U.S. Cl. ........................................................ 370/338
(58) Field of Classification Search ........................ None
See application file for complete search history.

(56) References Cited

U.S. PATENT DOCUMENTS

| | | | |
|---|---|---|---|
| 6,961,595 B2 * | 11/2005 | Laroia et al. | 455/574 |
| 6,970,449 B1 * | 11/2005 | Smith et al. | 370/349 |
| 7,061,880 B2 * | 6/2006 | Basilier | 370/312 |
| 7,184,413 B2 * | 2/2007 | Beyer et al. | 370/254 |
| 7,298,716 B2 * | 11/2007 | Abraham et al. | 370/321 |
| 7,310,524 B2 * | 12/2007 | Kurokawa | 455/426.2 |
| 7,324,497 B2 * | 1/2008 | Ikeda et al. | 370/345 |
| 7,653,003 B2 * | 1/2010 | Stine | 370/252 |
| 7,660,578 B2 * | 2/2010 | Viitamaki et al. | 455/426.2 |
| 2002/0196749 A1 * | 12/2002 | Eyuboglu et al. | 370/328 |
| 2004/0125795 A1 * | 7/2004 | Corson et al. | 370/356 |
| 2004/0259542 A1 * | 12/2004 | Viitamaki et al. | 455/426.2 |
| 2004/0266427 A1 * | 12/2004 | Kurokawa | 455/426.2 |
| 2005/0190784 A1 * | 9/2005 | Stine | 370/445 |

(Continued)

FOREIGN PATENT DOCUMENTS

CN 1585366 A 2/2005

(Continued)

OTHER PUBLICATIONS

International Preliminary Report on Patentability—PCT/US07/072681, International Search Authority—The International Bureau of WIPO—Jan. 6, 2009.

(Continued)

*Primary Examiner* — Ayaz Sheikh
*Assistant Examiner* — Faiyazkhan Ghafoerkhan
(74) *Attorney, Agent, or Firm* — Peng Zhu; Abdollah Katbab

(57) ABSTRACT

Broadcast or multicast traffic is classified into different types of traffic such that different types of traffic are transmitted over different sub-networks. In addition, different transmission schedules may be associated with each of the different sub-networks. A device may thus be configured to receive only a selected portion of the different types of traffic by only waking from a power save mode at the intervals at which the corresponding sub-network sends the traffic. The standby time of the wireless station may thus be improved because the wireless station may awaken less frequently and for shorter periods of time. Different sub-networks carrying different types of broadcast and multicast traffic may be implemented in an 802.11-based system. For example, a single access point may define multiple basic service set identifiers for a single wireless channel.

65 Claims, 8 Drawing Sheets

U.S. PATENT DOCUMENTS

| | | | |
|---|---|---|---|
| 2006/0104301 A1* | 5/2006 | Beyer et al. .................. | 370/445 |
| 2006/0129630 A1* | 6/2006 | Catalina-Gallego et al. . | 709/203 |
| 2007/0041350 A1* | 2/2007 | Famolari ...................... | 370/338 |
| 2009/0149127 A1* | 6/2009 | Viitamaki et al. ........... | 455/41.2 |

FOREIGN PATENT DOCUMENTS

| | | |
|---|---|---|
| EP | 1511335 | 3/2005 |
| EP | 1511335 A2 | 3/2005 |
| JP | 2005020626 A | 1/2005 |
| WO | 0169859 | 9/2001 |

OTHER PUBLICATIONS

Written Opinion PCT/US07/072681, International Search Authority—European Patent Office—Jan. 31, 2008.

Chulsik, Y. et al.: "Enhancement on Sleep Mode operation in the 802.16e" Internet Citation, (online) Sep. 4, 2003, XP002336700, Retrieved from trom URL: http://www.ieee802.org/16/tge/contrib/C80216e-03_45.pdf on Jul. 19, 2005.

International Search Report—PCT/US07/072681, International Search Authority—European Patent Office—Jan. 31, 2008.

* cited by examiner

STANDBY TIME IMPROVEMENTS USING SUB-NETWORKS

CLAIM OF PRIORITY UNDER 35 U.S.C. §119

This application claims the benefit of and priority to U.S. Provisional Patent Application No. 60/817,679, filed Jun. 30, 2006, and entitled "STANDBY TIME IMPROVEMENTS FOR WLAN WITH DUAL SSID," the disclosure of which is hereby incorporated by reference herein.

BACKGROUND

1. Field

This application relates generally to communications, and to traffic classified into different types transmitted over different sub-networks.

2. Background

An electronic device may support one or more communication protocols to transmit information to and receive information from other electronic devices. For example, a mobile device may support a wireless protocol such as IEEE 802.11 to communicate over airwaves with another device. Under 802.11, an access point may define one or more basic service sets for communicating with one or more sets of wireless stations. Here, each basic service set is defined by a unique basis service set identifier ("BSSID"). A device may thus communicate with another device via a given basic service set by including the corresponding basic service set identifier in each frame sent to the other device.

In wireless applications it is desirable to increase the amount of time a mobile device may be operated between battery recharges. In general, a mobile device operates in one of two states. Talk-time generally refers to the time the mobile device is actively engaged in sending or receiving user traffic such as when a call is in progress. Standby time generally refers to the time the mobile device is not in active communication but is not completely turned off. During standby time the mobile device may still transmit and receive certain types of traffic such as signaling. A conventional method of increasing operating time of a mobile device is to incorporate a relatively large battery into the mobile device. Unfortunately, this method may be both costly and inconvenient for a user of the mobile device.

A communication protocol such as those in the IEEE 802.11 family may support power savings in a wireless communication device by defining procedures that enable a mobile device to transition to a power save mode when it is not actively transmitting or receiving data. For example, an 802.11-based access point that provides traffic frames to a mobile device may buffer the frames when the mobile device is in the power save mode. In addition, the 802.11 family of protocols defines procedures that enable the mobile device to, upon transitioning from the power save mode to a normal operating mode, access a communication channel to receive frames from and transmit frames to the access point.

For downlink broadcast or multicast traffic, the access point will temporarily buffer the traffic in the event any mobile device in a given basic service set is in the power save mode. In this case, the access point will transmit the broadcast or multicast traffic to the mobile devices in the basic service set at predefined intervals. Thus, any mobile device in a power save mode may wake at the predefined intervals to receive the buffered broadcast or multicast traffic for that basic service set.

In some applications the user of a given mobile device may only wish to receive some of the broadcast or multicast traffic. However, in conventional 802.11-based approaches, the mobile device is configured to wake from the power save mode at every designated interval to ensure that the user receives all of the broadcast or multicast traffic of interest. As a result, standby time of the mobile device may be reduced due to the need to awaken and receive what may often be unwanted traffic.

SUMMARY

A summary of sample aspects of the disclosure follows. For convenience, one or more aspects may simply be referred to herein as "an aspect" or "aspects."

In some aspects broadcast or multicast traffic is classified into different types of traffic that are transmitted over different sub-networks. For example, certain types of broadcast or multicast traffic associated with (e.g., received from) a primary network may be transmitted over one sub-network while other types of broadcast or multicast traffic associated with the primary network may be transmitted over another sub-network.

In some aspects different transmission schedules are associated with each of the different sub-networks. For example, traffic may be transmitted over one sub-network according to a first time interval while traffic may be transmitted over another sub-network according to a second time interval, where the second time interval is different than the first time interval. In this way, a device may be configured to receive only a selected portion of the different types of traffic provided by the primary network by only waking from a power save mode at the intervals at which the corresponding sub-network sends the traffic. Here, the different types of broadcast or multicast traffic may consist of data sent in various forms including, for example, streaming data. For convenience these different types of data (e.g., different types of data streams) will be referred to herein simply as different types of "traffic."

In some aspects the different types of broadcast and multicast traffic may comprise user plane traffic and control plane traffic. For example, user plane traffic may be associated with user applications while control plane traffic may be associated with managing or accessing a device.

In some implementations control plane traffic may be transmitted via a first sub-network while control plane traffic and user plane traffic is transmitted over a second sub-network. In addition, while in power save mode the first sub-network may transmit traffic less frequently that the second sub-network. Thus, a wireless station that does not need to receive the user plane traffic but does need to receive the control plane traffic, may elect to only wake from a power save mode to receive traffic from the first sub-network. In this way, the standby time of the wireless station may be improved because the wireless station may awaken less frequently and for shorter periods of time.

In some aspects different sub-networks carrying different types of broadcast and multicast traffic may be implemented in an 802.11-based system. Here, an access point may be configured to filter broadcast and multicast traffic associated with a primary network to categorize the traffic into different types and provide the categorized traffic over different sub-networks. The access point may also assign different transmission schedules to each of the different sub-networks.

A wireless station may then be adapted to receive a selected portion of the types of traffic by associating with one of the sub-networks. For example, the wireless station may only wake from a power save mode at intervals corresponding to the transmission schedule of the selected sub-network.

In some aspects a single access point (e.g., in a single physical unit) hosts multiple basic service sets on a single wireless channel. In this way, the access point may provide different subsets of traffic on different sub-networks (each of which is associated with a given basic service set identifier) over a common channel.

In some aspects a method of receiving broadcast or multicast traffic from at least one of a plurality of different wireless sub-networks associated with a common network comprises identifying at least one of the plurality of different wireless sub-networks from which traffic is to be received; and receiving at least one of a plurality of different types of broadcast or multicast traffic via the at least one of a plurality of different wireless sub-networks, wherein different broadcast or multicast traffic transmission schedules are associated with the different wireless sub-networks.

In some aspects an apparatus for receiving broadcast or multicast traffic from at least one of a plurality of different wireless sub-networks associated with a common network comprises an identifier adapted to identify at least one of the plurality of different wireless sub-networks from which traffic is to be received; and a receiver adapted to receive at least one of a plurality of different types of broadcast or multicast traffic via the at least one of a plurality of different wireless sub-networks, wherein different broadcast or multicast traffic transmission schedules are associated with the different wireless sub-networks.

In some aspects an apparatus for receiving broadcast or multicast traffic from at least one of a plurality of different wireless sub-networks associated with a common network comprises means for identifying at least one of the plurality of different wireless sub-networks from which traffic is to be received; and means for receiving at least one of a plurality of different types of broadcast or multicast traffic via the at least one of a plurality of different wireless sub-networks, wherein different broadcast or multicast traffic transmission schedules are associated with the different wireless sub-networks.

In some aspects a computer program product, for receiving broadcast or multicast traffic from at least one of a plurality of different wireless sub-networks associated with a common network, comprises computer-readable medium comprising code for causing at least one computer to: identify at least one of the plurality of different wireless sub-networks from which traffic is to be received; and receive at least one of a plurality of different types of broadcast or multicast traffic via the at least one of a plurality of different wireless sub-networks, wherein different broadcast or multicast traffic transmission schedules are associated with the different wireless sub-networks.

In some aspects a method of providing classified broadcast or multicast traffic comprises obtaining broadcast or multicast traffic; classifying the broadcast or multicast traffic into different types of broadcast or multicast traffic; and associating the different types of broadcast or multicast traffic with different wireless sub-networks that are associated with a common network.

In some aspects an apparatus for providing classified broadcast or multicast traffic comprises a receiver adapted to obtain broadcast or multicast traffic; a classifier adapted to classify the broadcast or multicast traffic into different types of broadcast or multicast traffic; and a traffic scheduler adapted to associate the different types of broadcast or multicast traffic with different wireless sub-networks that are associated with a common network.

In some aspects an apparatus for providing classified broadcast or multicast traffic comprises means for obtaining broadcast or multicast traffic; means for classifying the broadcast or multicast traffic into different types of broadcast or multicast traffic; and means for associating the different types of broadcast or multicast traffic with different wireless sub-networks that are associated with a common network.

In some aspects a computer program product, for providing classified broadcast or multicast traffic, comprises computer-readable medium comprising code for causing at least one computer to: obtain broadcast or multicast traffic; classify the broadcast or multicast traffic into different types of broadcast or multicast traffic; and associate the different types of broadcast or multicast traffic with different wireless sub-networks that are associated with a common network.

BRIEF DESCRIPTION OF THE DRAWINGS

These and other features, aspects and advantages relating to the disclosure will be more fully understood when considered with respect to the following detailed description, appended claims and accompanying drawings, wherein:

FIG. 2, including

Figure 1:
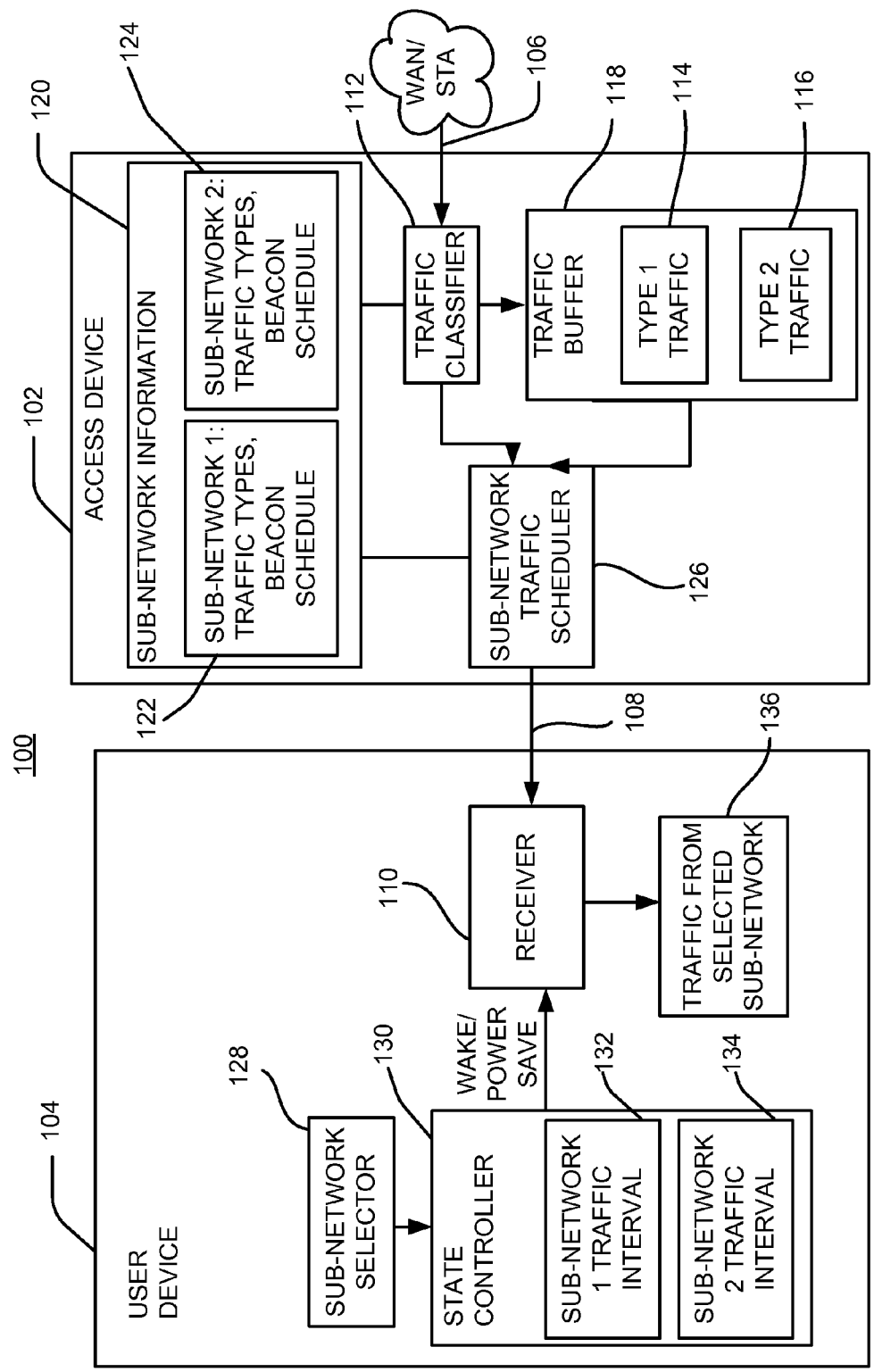
FIG. 1 is a simplified block diagram of several sample aspects of a communication system where broadcast or multicast traffic classified into different types of traffic is provided over multiple sub-networks.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

FIG. 1 illustrates certain aspects of a communication system 100 where broadcast or multicast traffic may be classified into two or more different types of traffic and provided over two or more different sub-networks at different time intervals. As an example, one subset of the different types of traffic may be provided over a first sub-network while another subset of the different types of traffic may be provided over a second sub-network.

Through the use of such techniques, the system 100 may be employed in a manner that improves standby time of wireless devices that receive the classified broadcast or multicast traffic. For example, a given wireless device may only need to receive a certain type (or certain types) of the broadcast or multicast traffic that tends to be delivered less frequently than other types of the broadcast or multicast traffic. In this case, the system 100 may be configured to provide these different types of traffic on different sub-networks having different traffic transmission schedules. Moreover, the traffic transmission schedules of the different sub-networks may be defined based on, for example, the relative data rates or quality of service requirements of the different types of traffic. Thus, a wireless device may elect to only wake from a power save mode to receive traffic from the sub-network that provides the desired type or types of traffic. In other words, the wireless device may elect to not wake from a power save mode to receive traffic from any sub-network that does not provide the desired type or types of traffic. Consequently, such a wireless device may wake less often and may be awake for shorter periods of time as compared to wireless devices that are deployed in conventional systems that send all traffic at the same interval over a single network.

These and other aspects of the system 100 will be treated in more detail with reference to the sample components depicted in FIG. 1. The system 100 includes an access device 102 that communicates with one or more associated user devices (e.g., access terminals). For convenience, various aspects of a user device will be discussed with reference to a user device 104. Broadcast or multicast traffic (e.g., data in the form of frames, packets, etc.) destined for the user device 104 may be obtained by the access device 102 in various ways. For example, in some implementations the access device 102 may receive traffic from another communication device via a network (e.g., a wide area network, "WAN") as represented by a link 106. In some implementations the access device 102 may receive traffic destined for the user device 104 directly from another user device or some other device as represented by the link 106. In some implementations the access device 102 may generate traffic destined for the user device 104. For example, the access device 102 may generate address resolution protocol ("ARP") or dynamic host configuration protocol ("DHCP") traffic.

As mentioned above, under certain circumstances a given user device may only need to receive a portion of the broadcast or multicast traffic. For example, the broadcast or multicast traffic may include control plane traffic (e.g., ARP traffic or other management-related traffic), user plane traffic (e.g., streaming audio or video) and, in some applications, some other type of traffic. In some instances, however, the user device may have no use for the user plane traffic. For example, the user may not have a subscription to receive a broadcast or multicast from a given access point or a user may not wish to watch the current streaming programming.

To facilitate providing a desired type or types of traffic to a user device, the access device 102 classifies traffic destined for the user devices into different traffic types (e.g., control plane traffic, user plane traffic, etc.). The access device 102 then transmits the different traffic types to the user devices via different sub-networks as represented by a link 108 in FIG. 1.

As mentioned above, the access device 102 may define different transmission times for the sub-networks. For example, when a user device associated with a first sub-network is in a power save mode, the access device 102 may transmit broadcast or multicast traffic over that sub-network at times based on a first time interval. In contrast, when a user device associated with a second sub-network is in a power save mode, the access device 102 may transmit broadcast or multicast traffic over that sub-network at times based on a second time interval. Here, the second time interval may be different (e.g., longer) than the first time interval. Such an arrangement may be employed, for example, when the second sub-network carries traffic that is sent less frequently or has a lower quality of service requirement than the traffic carried by the first sub-network. In a specific example, the first sub-network may be used for low latency broadcast or multicast applications such as mobile television while the second sub-network is configured to optimize power savings of user devices during idle periods.

The user device 104 may transition to a power save mode when it is not sending or receiving traffic. For example, during the power save mode at least a portion of the components of the user device 104 may be switched to a suspended state or powered down. In a typical application, lower layer components such as a receiver 110 (e.g., a radio component) may be switched to a suspended state to conserve power. In this way, the user device 104 may conserve power, thereby increasing its standby time.

Various provisions may be made to ensure that traffic flow is not unduly compromised when a user device is in a power save mode. For example, the access device 102 may buffer broadcast or multicast traffic destined for the user devices when any of the user devices (e.g., user device 104) is in a power save mode. The access device 102 may then be configured to send the buffered traffic to the user devices at defined intervals. In this case, each user device is configured to wake from its power save mode at the defined intervals to receive the traffic from the access device 102 and, if applicable, send traffic to the access device 102.

A traffic classification and sub-network scheme as discussed above may be employed to improve the standby time of user devices. For example, the access device 102 may configure the first sub-network to carry user plane traffic (e.g., streaming data) and control plane traffic, and configure the second sub-network to only carry control plane traffic. Moreover, the second sub-network may employ a longer interval between traffic transmissions for the power save mode than the first sub-network. In the event the user device 104 does not need to receive the user plane traffic, the user device 104 may associate with the second sub-network rather than the first sub-network. In this way, the user device 104 may only wake from a power save mode to receive the broadcast or multicast traffic from the second sub-network. Moreover, the user device 104 may wake less often to retrieve this traffic due to the longer times between transmissions on the second sub-network.

The access device 102 and the user device 104 may take various forms depending on the requirements of a given application. For example, a user device may comprise a cellular phone, a smart phone, a cordless phone, a laptop computer, a PDA, a wireless device, a wireless modem, a mobile device, a handset, a handheld device, a satellite radio, a global positioning system, or some other communication device. A user device also may be referred to as user equipment (UE), an access terminal, a station (STA), a wireless communication device, a terminal, a user terminal, mobile equipment, a subscriber unit, or described using some other terminology.

Figure 2A:
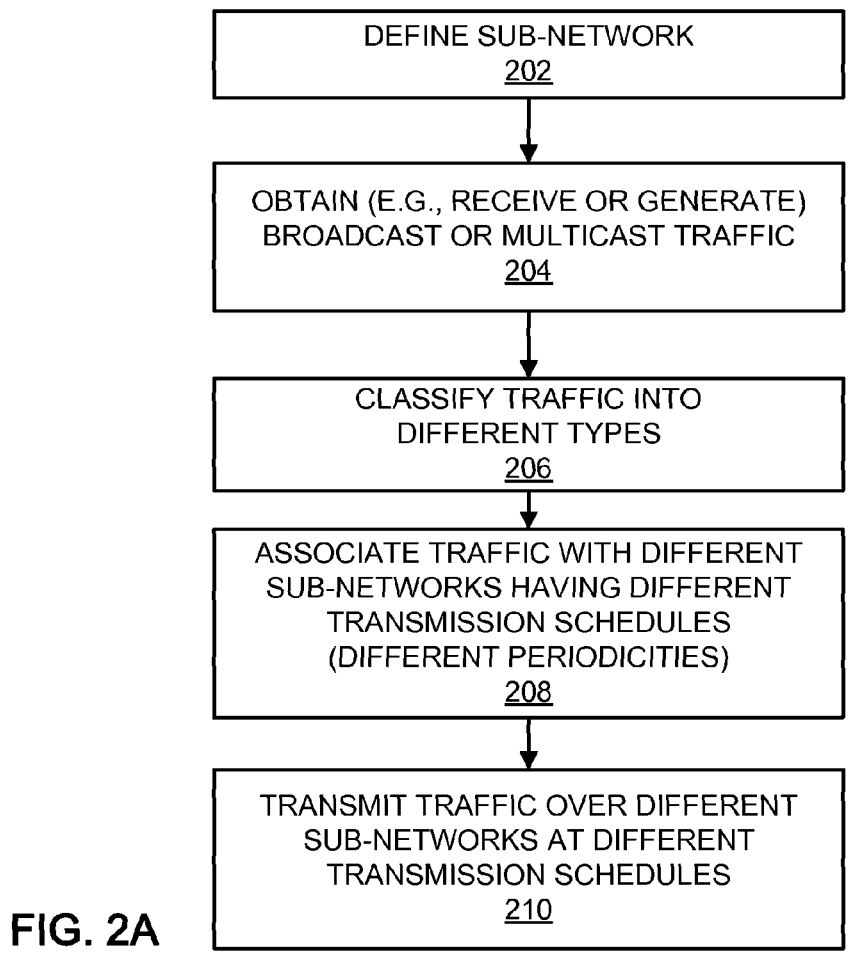
FIGS. 2A and 2B, is a flowchart of several sample aspects of operations that may be performed in conjunction with providing broadcast or multicast traffic classified into different types of traffic over multiple sub-networks.
Figure 2B:
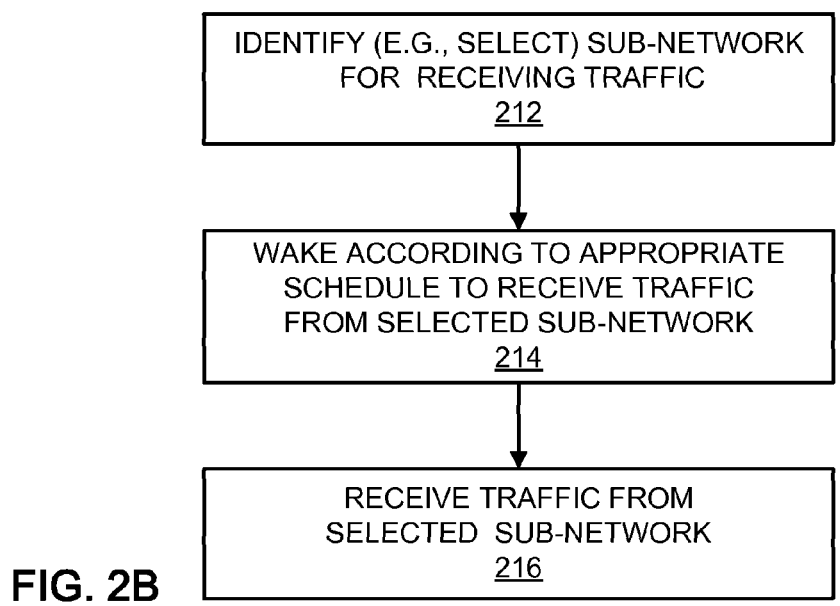

With the above overview in mind, several additional aspects of the disclosure will be discussed in conjunction with the flowchart of FIG. 2 and with further reference to FIG. 1. FIG. 2A relates to operations that may be performed to classify broadcast or multicast traffic into different traffic types and send the traffic over different sub-networks. FIG. 2B relates to operations that may be performed to selectively receive one or more of the different types of broadcast or multicast traffic via one of the sub-networks. Variations of the operations of FIG. 2B may be performed by stations associated with different sub-networks to receive different types of traffic from the same access point. Similarly, variations of the operations of FIG. 2B may be performed by a given station that associates with different sub-networks at different times to receive different types of traffic from the same access point. As an example of the latter scenario, a station may associate with a first sub-network, then at some later point in time disassociate with the first sub-network and associate with another sub-network. For convenience, the operations of FIG. 2 (and any other flowchart herein) may be described in conjunction with specific components (e.g., the components of FIG. 1). It should be appreciated, however, that these operations may be performed in conjunction with other components.

As represented by block 202 in FIG. 2A, at some point the access device 102 defines several sub-networks. As discussed herein these sub-networks may be related in that they are associated with a common network whereby the sub-networks carry at least a portion of the traffic carried by the common network. In some aspects a common network may comprise, for example, a network or service that is accessed using a given set of authentication credentials, a given security context, or accessed in some other common manner.

As represented by block 204, the access device 102 obtains the broadcast or multicast traffic in some manner. In the example of FIG. 1, the access device 102 may receive broadcast or multicast traffic via the link 106 or may generate the broadcast or multicast traffic.

As represented by block 206, the access device 102 classifies the broadcast or multicast traffic according to the supported traffic types. For example, in FIG. 1 a traffic classifier 112 may classify the traffic then store the traffic (designated as one of two traffic types 114 and 116) in a traffic buffer 118 when one or more user devices that are to receive the traffic is in a power save mode.

As represented by block 208, the access device 102 may associate the different types of traffic with different sub-networks having different transmission schedules. As illustrated in FIG. 1, the access device 102 may maintain traffic type and associated transmission schedule (e.g., beacon schedule) information 120 for each sub-network. For example, the access device 102 may maintain a beacon schedule for a first sub-network and the type or types of traffic to be sent over the first sub-network as represented by a block 122. In addition, the access device 102 may maintain a beacon schedule for a second sub-network and the type or types of traffic to be sent over the second sub-network as represented by a block 124.

As represented by block 210, each traffic type may thus be transmitted to the user devices (or other devices) over the appropriate sub-network(s) in accordance with each associated transmission schedule. For example, in FIG. 1 a network traffic scheduler 126 may initiate transmission of the buffered type 1 traffic 114 over the first sub-network at intervals defined by the schedule information 122. Similarly, the network traffic scheduler 126 may initiate transmission of the buffered type 2 traffic 116 over the second sub-network at intervals defined by the schedule information 124.

Referring now to FIG. 2B, as represented by block 212 a device (e.g., user device 104) that may be configured to receive the traffic transmitted at block 210 may elect to receive traffic via one of the sub-networks. In FIG. 1, a sub-network selector 128 may, under manual or automatic control, determine the sub-network from which traffic is to be received by the user device 104. This process may involve, for example, determining which type or types of traffic to receive, and then determining which sub-network carries that traffic. In this way, the traffic type selector 128 may elect to only receive, for example, type 2 traffic.

The user device 104 includes a state controller 130 for controlling an operating state of one or more components of the user device 104. For example, the state controller 130 may switch the receiver 110 between a wake mode (e.g., a normal, active state), a power save mode (e.g., a suspended or sleep state), and any other suitable mode.

As represented by block 214, a device may transition from a power save mode to a wake mode at appropriate times to receive traffic from the selected sub-network. Here, the appropriate wake times for a given sub-network may be derived from corresponding parameters 132 and 134 stored in the user device 104. As an example, in the event the selector 128 selected sub-network 2, the state controller 130 may cause the receiver 110 to transition to the wake mode at time intervals defined by the sub-network 2 traffic interval 134 (e.g., corresponding to the beacon interval information 124).

As represented by block 216, the receiver 110 may thus be activated to receive traffic over the link 108 from the selected sub-network 136. The user device 104 may then store or forward the received traffic 136 and, if desired, return to the power save mode. Advantageously, the user device 104 need not wake to receive the traffic from sub-network 1. Accordingly, the standby time of the user device 104 may be improved because it may remain in a power save mode for a longer period of time as opposed to a more conventional approach where the user device 104 may wake to check for and analyze all broadcast or multicast traffic transmitted by the access device 102.

An apparatus or method involving the classification of broadcast or multicast traffic into different types of traffic where the traffic is provided over multiple sub-networks be implemented in a variety of ways. For convenience, additional details will now be described in the context of an 802.11-based system. It should be appreciated, however, that the teachings herein are not limited to this type of system or to the components and operations specifically set forth herein. For example, other protocols and techniques may be employed to define multiple sub-networks as taught herein.

In an 802.11-based system, groups of devices cooperate to form basic service sets in an attempt to enable each group of devices to effectively communicate without substantial interference from neighboring groups of devices. For example, a first basic service set may be established on a particular wireless channel whereby all communications (e.g., data frames) include a basic service set identifier that uniquely defines that basic service set. Thus, a neighboring basic service set that operates on a different channel will not substantially interfere with the first basic service set due to the differing operating frequencies. Conversely, devices of a neighboring basic service set that operates on the same channel as the first basic service set will not process transmissions from the first basic service set because those devices use a different basic service set identifier.

A basic service set may be established in various ways. In a typical application an access point (e.g., that provides access to another network) establishes the basic service set and, to some extent, controls traffic flow over the basic service set. Here, the access point generates periodic beacons to enable a wireless station to locate the basic service set and to facilitate traffic control in the basic service set. For example, a wireless station entering the coverage area of an access point may scan for beacons, and then associate with the access point to join the basic service set. Once the station joins the basic service set, the access point may route data from the network to the station and route data from the station to the network.

In other applications a set of stations may cooperate to form a basic service set. For example, in an independent basic service set implementation (e.g., an adhoc network) functionality that may otherwise be provided by an access point (e.g., generating beacons) may be implemented in and shared among several neighboring stations.

In some applications a given access point may establish multiple basic service sets. For example, in a multiple BSSID application, the access point may define more than one basic service set identifier and send different basic service set identifiers in different beacons. In this way, a station entering the coverage area of the access point may detect multiple basic service sets from the same access point. Typically, the multiple basic service sets are established over the same channel. However, in applications where the access point (or a station in an adhoc network) has multiple radios, the different basic service sets may be established over different channels. That is, one basis service set may be established on one channel while another basic service set may be established on another channel.

For convenience, the description that follows discusses an application where a single access point establishes multiple basic service sets over a single channel. It should be appreciated, however, that the teachings herein may be implemented in conjunction with basic service sets established using any of the above techniques. For example, the basic service sets may be established by an adhoc network, over multiple channels, or in some other suitable manner.

In an 802.11 implementation the access device 102 of FIG. 1 may comprise an access point ("AP") and the user device 104 may comprise a wireless station ("STA"). Here, the access point may establish multiple sub-networks by defining multiple basic service sets. That is, each sub-network is associated with a unique basic service set identifier (sub-network identifier). Sample implementation details of these components will be discussed in conjunction with FIGS. 3 and 4.

Figure 3:
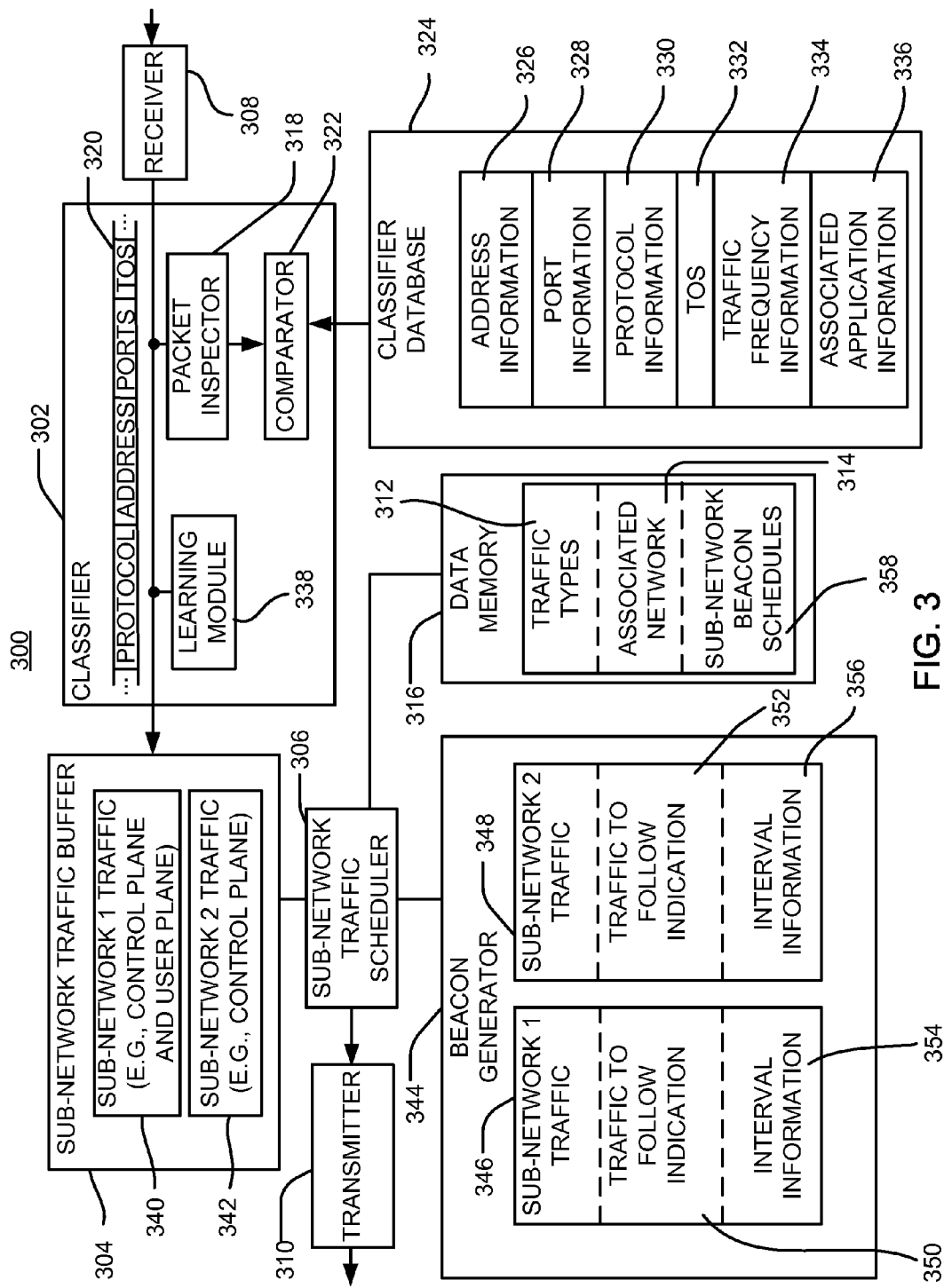
FIG. 3 is a simplified block diagram of several sample aspects of an access point apparatus.

FIG. 3 illustrates several aspects of an access point 300. The access point 300 includes a classifier 302, a sub-network traffic buffer 304, a sub-network traffic scheduler 306, and other components that may be similar to corresponding components in FIG. 1. Briefly, the access point 300 includes a receiver 308 (upper right portion of FIG. 3) that receives downlink traffic from, for example, a network, a local device, or in some implementations a component (not shown) of the access point 300 that generates the traffic. The classifier 302 classifies the received traffic into different types of traffic. In addition, when any stations in the basic service set that is to receive the traffic is in a power save mode, the access point 300 stores the classified traffic in the traffic buffer 304. The scheduler 306 cooperates with a transmitter 310 to transmit the different types of traffic to the stations via the appropriate basic service sets (sub-networks). Here, the timings of the transmissions depend on the transmission schedules (e.g., beacon schedules) of the basic service sets.

Figure 4:
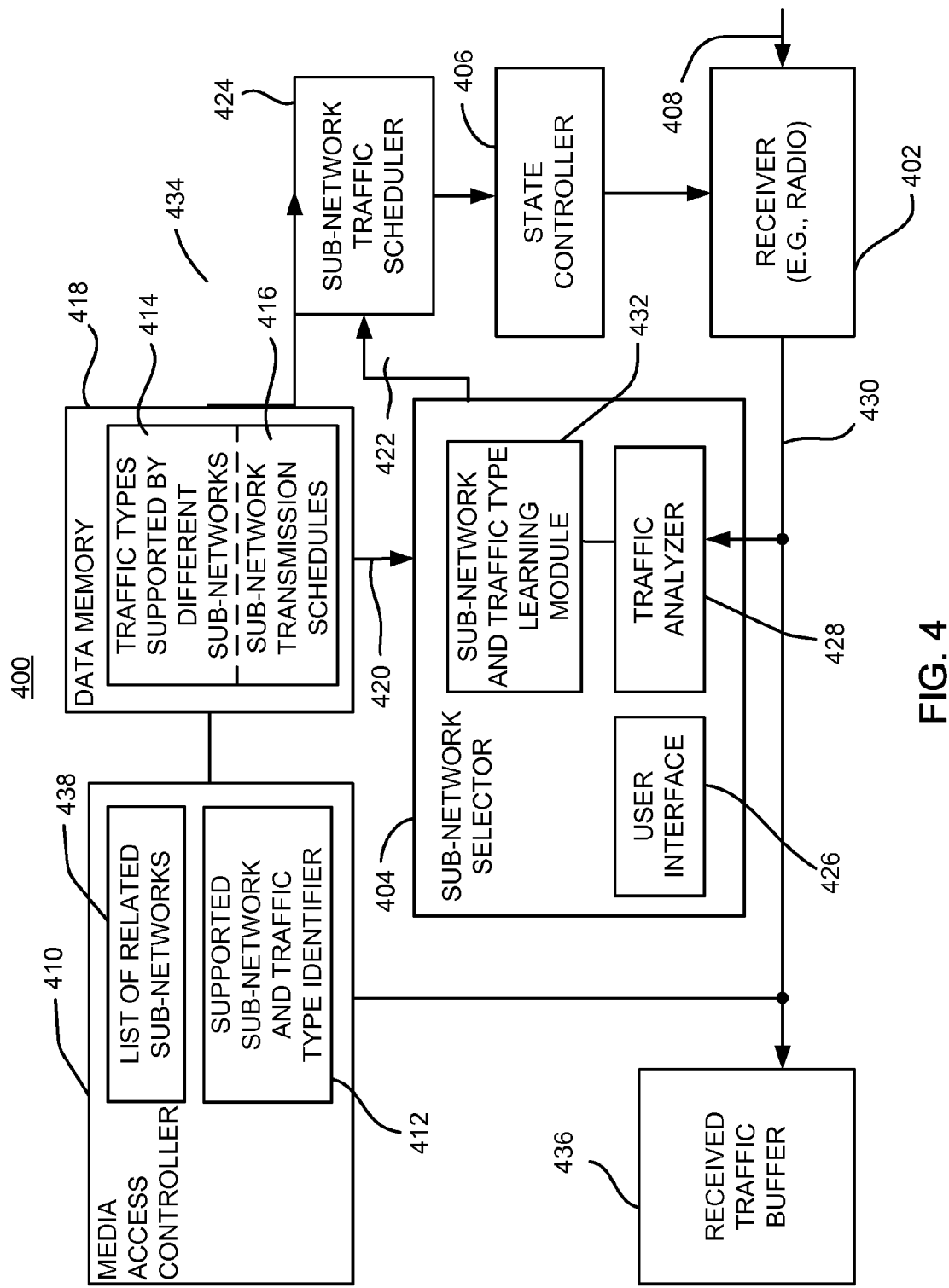
FIG. 4 is a simplified block diagram of several sample aspects of a wireless station apparatus.

FIG. 4 illustrates several aspects of a wireless station 400. The station 400 includes a receiver 402, a sub-network selector 404, a state controller 406, and other components that may be similar to corresponding components in FIG. 1. Briefly, the receiver 402 (lower right portion of FIG. 4) is adapted to receive the traffic transmitted by the transmitter 310 over an 802.11-based channel as represented by a line 408. Based on a selection made by the selector 404, the state controller 406 may cause the receiver 402 to wake from a power save mode at appropriate intervals to receive traffic from the selected sub-network.

Figure 5:
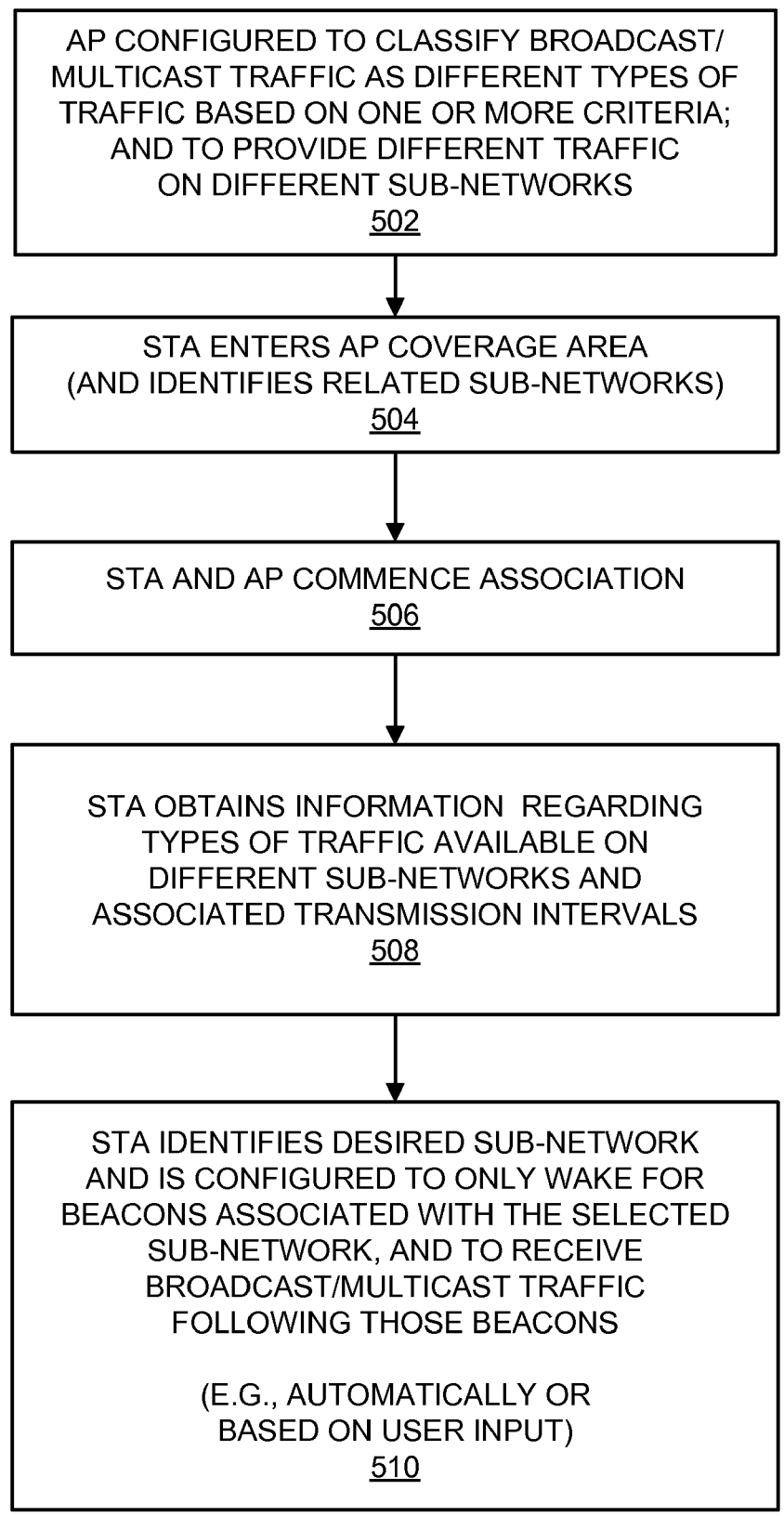
FIG. 5 is a flowchart of several sample aspects of operations that may be performed to configure a communication system.
Figure 6:
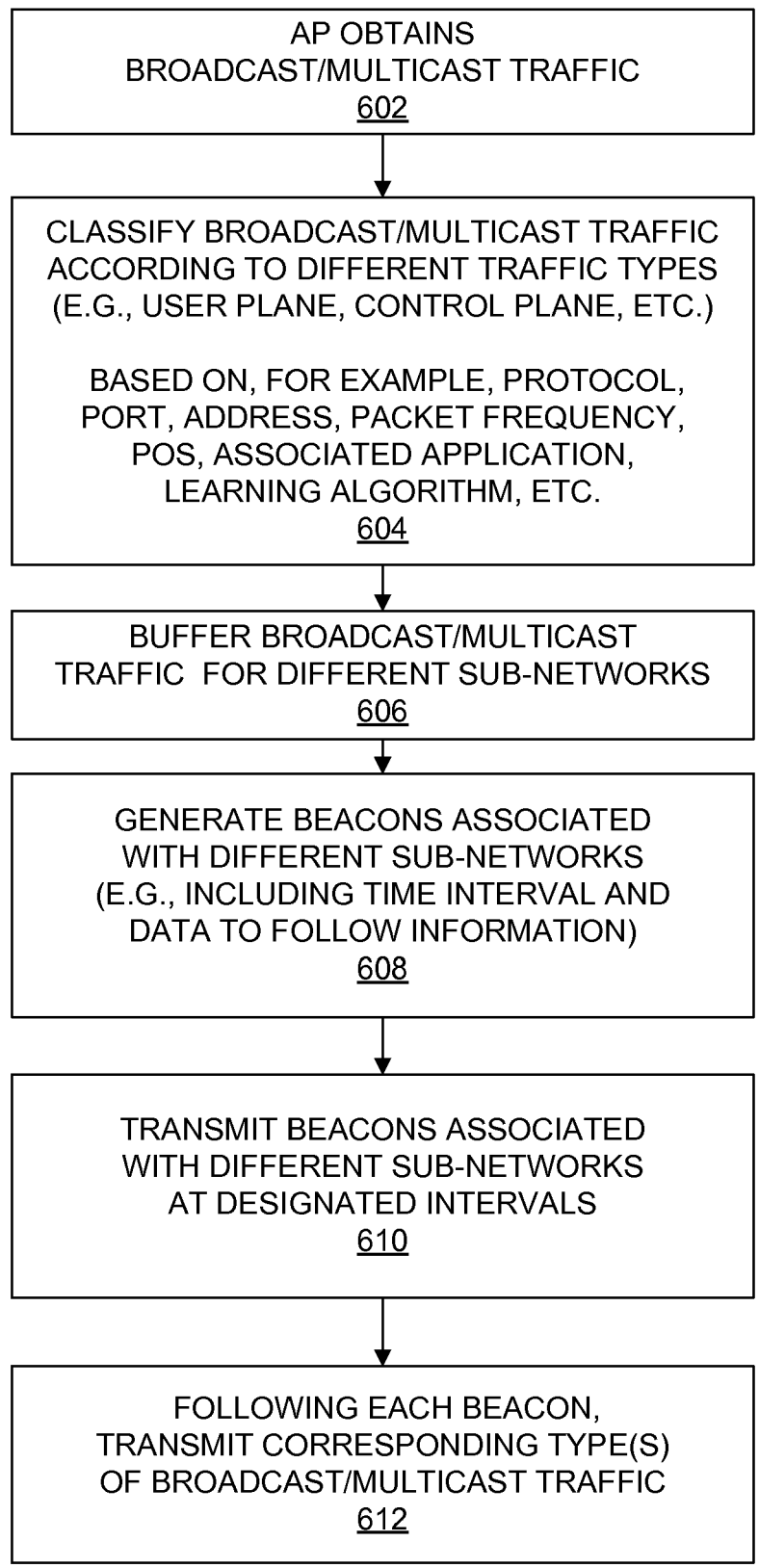
FIG. 6 is a flowchart of several sample aspects of operations that may be performed by an access point.
Figure 7:
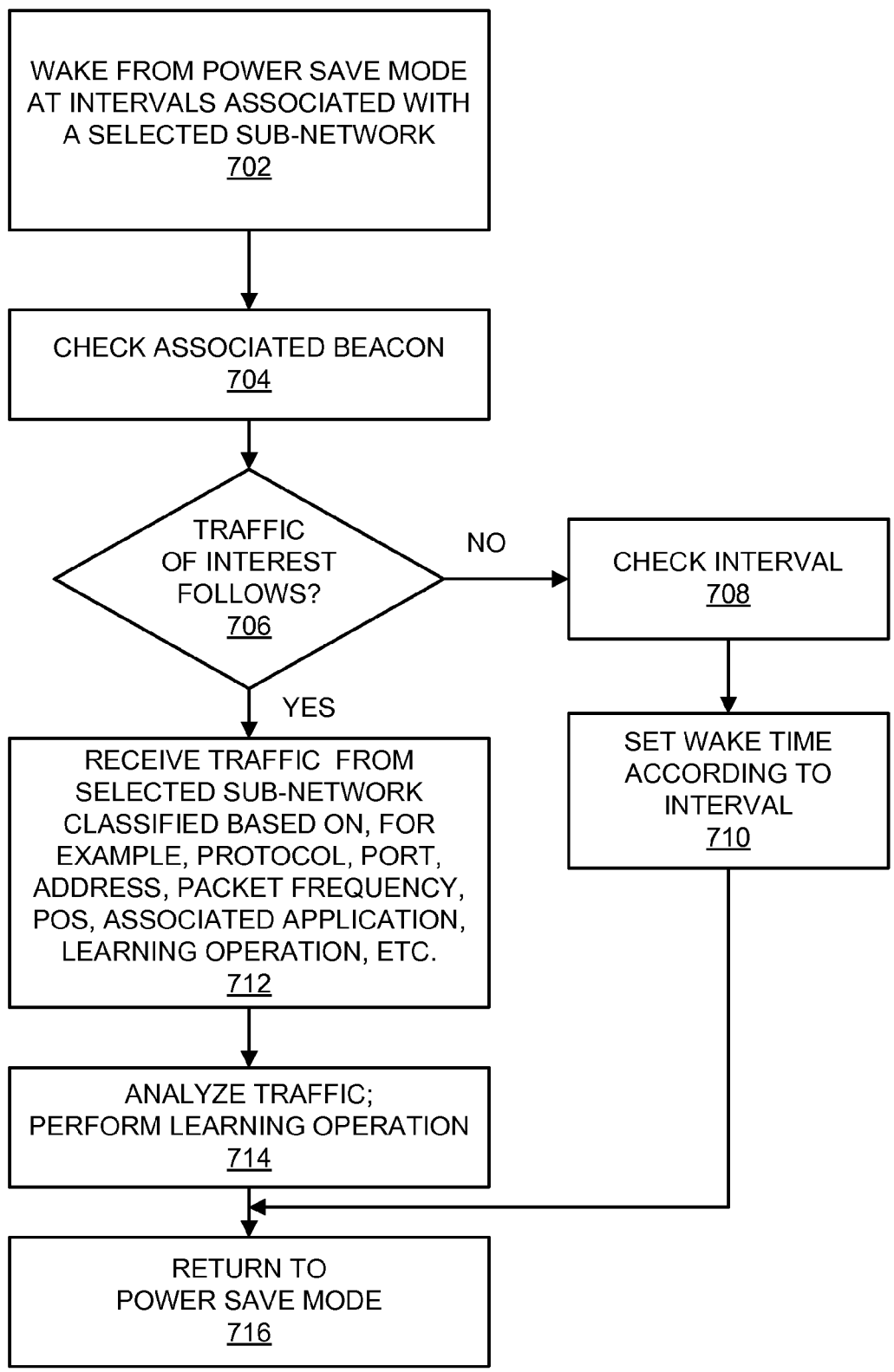
FIG. 7 is a flowchart of several sample aspects of operations that may be performed by a wireless station.

These and other sample operations will be discussed in more detail in conjunction with the flowcharts of FIGS. 5, 6, and 7. FIG. 5 relates to various aspects of operations that may be performed to configure an access point and associated stations. FIG. 6 relates to various aspects of operations that may be performed by an access point. FIG. 7 relates to various aspects of operations that may be performed by a station to receive traffic from one or more sub-networks.

Referring to FIG. 5, as represented by block 502, the access point 300 may be configured to, based on one or more criteria as discussed in more detail below, classify broadcast or multicast traffic into different types of traffic. In the event the access point 300 supports such classified traffic, the access point 300 may maintain information relating to supported traffic types 312 in a data memory 316. In some implementations the access point 300 may be statically configured by a system administrator to classify traffic according to the site's requirements. Alternatively, the traffic classification may be dynamic in nature. For example, the classification scheme may be modified over time via a download mechanism, a learning scheme, or some other suitable technique.

Traffic may be classified into a variety of different types depending upon the requirements of a given system. For example, as mentioned above in some aspects one type of broadcast or multicast traffic may be defined as user plane traffic. Such traffic may comprise, for example, traffic associated with a user application such as streaming data, audio, video, or similar traffic (e.g., traffic "consumed" by the application layer). Such traffic may originate from, for example, a television or radio broadcast, a server, or some other source and is typically displayed or played out to a user. The user plane traffic may thus include traffic associated with the content being delivered and/or traffic associated with operations that may be involved in the delivery of the content.

Another type of broadcast or multicast traffic may be defined as control plane traffic. Such traffic may comprise, for example, traffic associated with one or more of operating, managing or accessing a station. For example, control plane traffic may enable user connectivity, reachability, and discovery. Typically, this type of traffic may take the form of network broadcast traffic. In some aspects control plane traffic comprises traffic associated with one or more of the station's connectivity, topology, path discovery, address resolution protocol, dynamic host configuration protocol, presence, paging, or other similar operations. An example of presence relates to providing a list of available contacts in an instant messenger application. Control plane traffic is typically "consumed" by a media access control ("MAC") layer or an operating system.

It should be appreciated based on the teachings herein that traffic may be classified into a variety of types including one or more of the types set forth above, types other than those set forth above, or some combination of these types. For example, some stations may only be interested in receiving certain types of content. Accordingly, traffic may be classified based on the particular content of the broadcast or multicast traffic. Similarly, some stations may only be interested in receiving certain types of management (control) traffic. In this case, traffic may be classified based on different types of management traffic that may be sent to the stations via the broadcast or multicast traffic.

Moreover, depending upon the requirements of a given system, traffic may be classified into any number of types. That is, traffic may be classified into 2, 3, or more different types.

The access point 300 also associates at least a portion of the defined traffic types with each sub-network. For example, in some implementations one sub-network may be configured to carry only a portion of the different types of traffic (e.g., control plane traffic only) while another sub-network may be configured to carry every type of traffic (e.g., control plane and user plane traffic). In this example, the first sub-network (control plane traffic only) may enable improvements in the standby time for the stations while maintaining the operability of connectivity, reachability, and discovery protocols. In some implementations one sub-network may be configured to carry one subset of the different types of traffic (e.g., control plane traffic only) while another sub-network may be configured to carry another subset of the different types of traffic (e.g., user plane traffic only). In either case, the access point 300 (e.g., the scheduler 306) may maintain information 314 in the data memory 316 relating each sub-network with associated traffic type information 312.

Furthermore, the access point 300 may define transmission schedules for the sub-networks. Typically, different transmission schedules may be associated with each sub-network. In some cases, however, it may be desirable to assign the same or a similar transmission schedule to two or more sub-networks.

The transmission schedules may be defined in a variety of ways. For example, in some cases a transmission schedule may define a time interval at which traffic is repeatedly transmitted over a given sub-network. Alternatively, a transmission schedule may define a more random schedule of times at which traffic is transmitted over a sub-network. In practice, the actual transmission of traffic may not always occur at a time defined by a transmission schedule due to factors such as traffic congestion on the channel.

The transmission schedule of a given sub-network may depend on the transmission characteristics of the traffic carried by that sub-network. For example, the access point 300 may receive some types of traffic more frequently than other types of traffic. In addition, the access point may receive some types of traffic at relatively regular intervals (e.g., associated with applications with low latency requirements) and receive other types of traffic on a more irregular basis. Streaming traffic (e.g., an audio or a video broadcast) is a typical example of the former type of traffic. In some applications, this type of traffic may be streamed at intervals on the order of 100 ms or less. Management traffic (e.g., control plane traffic) is a typical example of the latter type of traffic. This type of traffic is typically bursty in nature and generally involves the transfer of, on average, a smaller quantity of information. Accordingly, the access point 300 may assign a relatively short time interval to a sub-network that carries traffic that is received relatively frequently, involves large transfers of data over time, or has low latency requirements. Conversely, the access point 300 may assign a longer time interval to a sub-network that carries traffic that is received less frequently, involves smaller transfers of data over time, or does not have low latency requirements.

As represented by block 504, a wireless station may continuously scan 802.11 channels for beacons so that when the station enters a coverage area of an access point, the station may receive the beacons from that access point. In applications where the access point has established multiple basic service sets, the station may receive beacons corresponding to each basic service set. The station may thus determine that it has entered a coverage area where it may elect to receive different types of traffic from different basic service sets (sub-networks).

In some applications an access point may use similar service set identifiers ("SSIDs") for the basic service sets that are associated with a common network (e.g., basic service sets that provide at least one common traffic feed or that provide complementary traffic feeds for the common network). For example, the ASCII names of the service set identifiers for the related basic service sets may include the same root (e.g., "ap3000_"). The remainder of the service set identifiers (e.g., "active" and "idle") may then uniquely identify the basic service set. In this case, when a station recognizes that two basic service sets have similar service set identifiers (e.g., "ap3000_active" and "ap3000_idle"), the station may readily determine that the two basic service sets are related in some manner. For example, the similar service set identifiers may indicate that they are providing different front-ends to a data service provided by a common network. Moreover, this may indicate to the station that it may utilize the corresponding sub-networks in a manner that improves standby time.

In some applications information regarding related sub-networks may be provided in the beacons. For example, a beacon for one sub-network may include a reference to a related sub-network and information regarding the traffic carried by the sub-network(s).

In some applications a station may be configured with knowledge of related basic service sets. For example, a list of related services sets (e.g., their associated identifiers) may be programmed into the memory of the station when the station is initially configured or at some other suitable time.

As represented by block 506, once a wireless station identifies a desired basic service set, the station and the access point may commence an association procedure. For example, these devices may negotiate to communicate in a certain way and/or to support various functionalities. To this end, the station 400 of FIG. 4 may incorporate a media access controller 410 that is adapted to communicate with the access point 300 of FIG. 3 to establish communications over an 802.11-based channel. To reduce the complexity of FIGS. 3 and 4, other components that may be involved in this and other conventional operations are not depicted.

As represented by block 508, in conjunction with the association procedure or at some other time, the station may obtain information regarding the different types of traffic and sub-networks supported by the access point. For example, the station may inform the access point that the station is interested in receiving broadcast or multicast traffic that has been classified into different types. In the example of FIGS. 3 and 4, a supported sub-network and traffic type identifier component 412 in the station 400 may send a query to the access point 300 to determine the types of traffic and sub-networks supported by the access point 300, if any. In some applications the station 400 (e.g., the identifier 412) and the access point 300 may negotiate to use different types of traffic, different sub-networks, and different transmission schedules (e.g., intervals). Through the above communications or some other communications, the station 400 (e.g., the identifier 412) may obtain the traffic type, sub-network, and transmission schedule information from the access point 300. The station 400 may then save, in a data memory 418, entries relating to the traffic types supported by the different sub-networks 414 and entries relating to the associated sub-network transmission schedules 416.

In some implementations the station 400 may be configured in some other manner with information regarding the different traffic types, sub-networks, and transmission intervals. For example, the access point 300 may implement a known classification scheme that defines different types of traffic, specific sub-networks upon which the different types of traffic are deployed, and corresponding transmission schedules. In this case, the station 400 may be configured with this classification scheme when the station 400 is placed in service or at some other time. Alternatively, the station 400 may be configured to "learn" this or some other classification scheme.

Referring again to FIG. 5, once the station receives the traffic information, etc., the station may be configured to receive one or more of the supported traffic types via a selected sub-channel (block 510). For example, as represented by a line 420 in FIG. 4, the sub-network selector 404 may access the traffic type and sub-network information 414 to identify a sub-network that carries the desired traffic. The sub-network selector 404 may then select the identified sub-network 414 and, as represented by a line 422, send this selection information to a sub-network traffic scheduler component 424.

The sub-network selector 404 may make a selection automatically, based on user input, or in some other suitable manner. For example, the station 400 may include a user interface 426 that is adapted to receive input from a user so that the user may select a desired sub-network or the types of traffic to be received by the station 400. In the latter case, the sub-network selector 404 may then select the appropriate sub-network based on the desired traffic type(s) and the information 414 stored in the data memory 418.

Alternatively, the selector 404 may employ a learning mechanism that enables the selector 404 to automatically select a traffic type. For example, the selector 404 may include a traffic analyzer 428 that analyzes received traffic on a link 430. The traffic analyzer 428 may thereby collect information to be used by a sub-network and traffic type learning module 432 to identify a desired sub-network (e.g., based on which type or types of traffic are to be selected). As an example, the traffic on the link 430 may indicate that the station has entered the coverage area of a known access point. Based on prior learning (e.g., manual or automatic), the learning module 432 may have an indication that certain types of traffic provided by that access point on certain sub-networks are unwanted. Accordingly, the selector 404 may elect to receive only some of the types of traffic from that access point (i.e., not the unwanted types of traffic) via an appropriate sub-network.

As will be discussed in more detail below, traffic delivery may be associated with the transmission of beacons by the access point. For example, in accordance with traditional 802.11-based operations, the access point may send beacons (e.g., delivery traffic indication map beacons) at regular intervals whereby each beacon may indicate whether broadcast or multicast traffic will follow the beacon. Thus, a station may be configured to wake at appropriate intervals to receive the beacon for a given sub-network to determine whether the access point will transmit the associated type or types of traffic following the beacon.

Referring now to FIG. 6, selected operations that may be performed by an access point to classify and transmit traffic will be discussed in more detail. As represented by block 602, the access point obtains broadcast or multicast traffic as discussed herein. For example, the receiver 308 in FIG. 3 may receive downlink traffic from a network and provide the traffic to the classifier 302.

As represented by block 604, the classifier 302 analyzes the received traffic and classifies the traffic as one of the supported traffic types. As discussed above, received traffic may be classified as user plane traffic, as control plane traffic, or as some other suitable type of traffic.

The classifier 302 may classify traffic based on one or more criteria. For example, in some aspects traffic may be classified based on the content of the traffic. In this case, the classifier 302 may include a packet inspector 318 that analyzes the contents of packets in the traffic. The packet inspector 318 may obtain information such as protocol information, address information, port information, and type of service information from a received packet 320. A comparator 322 may then compare the packet information with information stored in a classifier database 324. Based on this comparison, the classifier 302 may classify the received traffic (packet). In practice, the classifier 302 may use a given item of information from the classifier database 324 independently or in conjunction with other information (e.g., from the classifier database 324) to make a final determination as to the traffic type. Several examples of information that may be stored in the classifier database 324 follow.

The classifier database 324 may contain address information 326 that serves to identify a particular type of traffic. For example, a given source address and/or a given destination address may be associated with a particular type of traffic (e.g., streaming content, management, etc.). Advantageously, the address information may be used in applications where the received traffic is encrypted. That is, in general, address information will not be encrypted when other information in a packet (e.g., port information and content) is encrypted.

The classifier database 324 may contain port information 328 that serves to identify a particular type of traffic. For example, a given source port and/or a given destination port may be associated with a particular type of traffic (e.g., streaming content, management, etc.).

The classifier database 324 may contain protocol information 330 that serves to identify a particular type of traffic. For example, the user datagram protocol ("UDP") and/or the real-time protocol ("RTP") may be used to send streaming traffic. Accordingly, when received traffic supports a specified protocol 330, the classifier 302 may classify this traffic as a specific type of traffic (e.g., user plane). As discussed above, the classifier 302 may use this information in conjunction with other information to make a final determination as to the traffic type.

The classifier database 324 may contain type of service ("TOS") information 332 that serves to identify a particular type of traffic. Here, particular settings of the TOS bits in a packet may be used to identify a particular type of traffic.

Alternatively, traffic may be classified based on other characteristics of the traffic. In some aspects, the classifier 302 may maintain a record of the frequency at which a particular type of traffic has been received. In this case, traffic frequency information 334 may be associated with specific types of traffic. For example, content related traffic may be received relatively frequently while management or control traffic may be received relatively infrequently. Again, the classifier 302 may use the frequency information 334 in conjunction with other information to make a final determination as to the traffic type. For example, the frequency information may be collected along with address or port information to determine the frequency of a specific flow of traffic.

In some aspects, the classifier 302 may determine and/or maintain a record 336 relating to one or more applications that are associated with the traffic. Here, a particular application may be associated with a specific type or types of traffic.

The criteria used for the classification operation may be obtained in a variety of ways. For example, information may be manually entered into the classifier database 324 based on known relationships between the information and specific types of traffic. Conversely, a learning module 338 may be used to dynamically categorize various criteria associated with specific types of traffic. Here, the learning module 338 may analyze received traffic and based on, for example, information relating to prior classifications, the learning module may generate criteria that may be used to classify current or future traffic. In some aspects a station may provide a classifier for broadcast or multicast traffic to an access point by signaling using the 802.11 TCLAS (traffic classification) set forth in the TSPEC (traffic specification).

Referring again to FIG. 6, in the event any of the stations in any basic service set that is to receive the traffic is in a power save mode, the access point 300 may buffer the downlink broadcast or multicast traffic (block 606). In example of FIG. 3, the traffic is stored in the traffic buffer 304. Here, the type or types of traffic for each sub-network 340 and 342 may be stored in the traffic buffer 304 in a manner that enables all of the traffic for a given sub-network to be readily retrieved from the traffic buffer 304.

In some aspects, a station may send a message to the access point indicating that the station is going into a power save mode and that the station will only wake for traffic from a certain sub-network. The access point 300 may advantageously use this information to elect not to buffer traffic from other sub-networks when that station is in a power save mode.

In cases where the traffic is buffered, as represented by block 608, the access point 300 generates beacons corresponding to each of the corresponding sub-networks. As discussed above, a beacon may include information identifying the type of beacon, whether the access point will transmit traffic of a particular type immediately following the beacon, and transmission schedule information. In a typical implementation the beacons will comprise conventional delivery traffic indication map ("DTIM") beacons. In accordance with conventional practice, the DTIM beacon may be generated at a time interval that is a multiple of the time interval (e.g., 100 ms) of a standard 802.11-based beacon that includes a traffic indication map ("TIM"). Depending upon how the access point is configured, the DTIM interval may correspond to the beacon interval or a multiple of the beacon interval. In other words, the broadcast and multicast transmission schedule of a given sub-network may depend on the basic traffic indication map ("TIM") beacon interval and, if applicable, a DTIM multiple of that interval.

As discussed above, different transmission schedules may be assigned to each sub-network. As an example, a sub-network that supports user plane traffic may have a DTIM interval of 1 or 2, with a beacon interval on the order of 100 milliseconds, thereby transmitting its DTIM beacons every 100 or 200 milliseconds. Conversely, a sub-network that supports control plane traffic only may have a DTIM interval of 5, with a beacon interval on the order of 100 milliseconds, thereby transmitting its DTIM beacons every 500 milliseconds. It should be appreciated that a sub-network may employ a beacon interval or transmission schedule that is less than or more than the examples set forth above. For example, a sub-network may have a beacon interval on the order of one second or more.

In some aspects, an access point may support a dynamic method of providing transmission schedule information to the stations. For example, each beacon transmitted by the access point may include information specifying the time interval for each type of beacon (e.g., TIM, DTIM). In addition, each beacon may include a count specifying the number of beacons (e.g., regular beacons) that will be transmitted before the transmission of the next beacon of a specific type (e.g., DTIM). For example, when the corresponding count reaches zero, this serves as an indication that the current beacon is a DTIM beacon. In this way, a station may readily determine when it needs to wake from a power save mode to receive the DTIM beacon.

Referring to the example of FIG. 3, a beacon generator 344 may generate maps 346 and 348 corresponding to the beacons for each sub-network. In addition to unique BSSIDs and SSIDs, the maps 346 and 348 may include an indication 350 or 352 that the corresponding type of traffic will follow the beacon, and information 354 or 356 relating to the interval for that beacon or some other beacon.

Referring again to FIG. 6, the access point may thus transmit the beacons for each sub-network at the designated intervals (block 610) followed by the associated type or types of traffic (block 612). Referring to FIG. 3, the scheduler 306 may cooperate with the transmitter 310 to send the beacons and the traffic at the appropriate intervals. For example, the scheduler 306 may retrieve sub-network information 314 and corresponding schedule information 358 from the data memory 316 to determine when to send beacons for a given sub-network. The scheduler 306 may then retrieve the corresponding beacon information (e.g., beacon map 346 or 348) and provide this information to the transmitter 310 for transmission at the appropriate interval. Similarly, the scheduler 306 may use the information 312 and 314 to retrieve the appropriate type or types of traffic (e.g., traffic 340 or 342) for each sub-network, and then provide the traffic to the transmitter 310 for transmission following the corresponding beacon.

Referring now to FIG. 7, selected operations that may be performed by a station to receive a specific type or types of traffic via a selected sub-network will now be treated. In the example of FIG. 4, FIG. 7 may relate to a procedure whereby the selector 404 selects a sub-network for one or more of the supported traffic types 414 and sends a corresponding indication selection to the scheduler 424.

As represented by block 702 in FIG. 7, the station wakes from a power save mode at appropriate time intervals to receive the broadcast or multicast traffic from the selected sub-network. For example, the scheduler 424 may retrieve the schedule information 416 (via a line 434) corresponding to the selected sub-network as provided by the selector 404 via line 422. The scheduler 424 may then cooperate with the state controller 406 to transition the receiver 402 from a power save mode to an active mode so that the receiver 402 will receive the corresponding beacon for the selected sub-network.

As represented by block 704, as each beacon is received the station checks the contents of the beacon. As discussed above, the beacon may include an indication that a specific type of traffic will follow the beacon (block 706).

In the event the beacon does not include an entry indicating that traffic of interest follows the beacon, the station may check the time interval information from the beacon (block 708) to determine when the traffic of interest may be delivered. In this case, as discussed above, the scheduler 424 may set the wake time based on the corresponding time interval information (block 710). Thus, the state controller 406 may transition the receiver 402 back to the power save mode such that the receiver 402 remains in the power save mode until the designated wake time.

In contrast, in the event the beacon includes an entry at block 706 indicating that traffic of interest will follow the beacon, the operation proceeds to block 712. The station 400 may then receive the desired type(s) of broadcast or multicast traffic via the selected sub-network and store the traffic in a received traffic buffer 436. As discussed above, the received traffic may have been classified based on one or more of a protocol, a port, an address, packet frequency, TOS, associated application, a learning operation, or some other criterion.

In addition, as discussed above the station 400 may analyze the traffic and perform a learning operation, if applicable (block 714). The state controller 406 maintains the receiver 402 in an active mode until all of the traffic following the beacon has been received. Once all the traffic has been received (and all traffic transmitted from the station 400 in cases where the station has traffic to be transmitted), the state controller 406 transitions the receiver 402 back to the power save mode (block 716).

Through the use techniques such as those described above, a station looking to improve power savings may associate on a sub-network that only provides the control plane traffic, and then enable the 802.11 power save mode with the access point. Here, the station may select a listen interval that is a multiple of the DTIM interval to minimize its wake cycle. The station may then wake for the DTIM traffic to receive the control plane traffic and wake for the basic beacon every listen interval. The station may thus receive incoming group pages since they may be classified as control traffic that is sent after DTIM beacons. In addition, applications such as Session Initiation Protocol group paging and Universal Plug-and-Play may be enabled while maximizing standby time.

If only unicast traffic is of interest to the station, the station may remain in the power save mode until a unicast application (e.g., a VoIP call or videotelephony) starts. At this point, the station may turn off the power save mode on the wireless local area network for the duration of the traffic (e.g., the call).

Conversely, when the station invokes an application that relies on broadcast delivery such as mobile television, the station associates on a different sub-network where that traffic is supported. The station also may switch sub-networks in the event the station needs to receive traffic (e.g., control plane traffic) more frequently. For example, two sub-networks may provide similar traffic (e.g., a common type of traffic) yet transmit the traffic at intervals having differing periodicities. If an application using unicast transmissions such as VoIP or videotelephony is used at the same time as the broadcast application (e.g., mobile television), the station may switch to the wake state.

In some aspects provisions may be made to facilitate communication among devices (e.g., stations) that would otherwise be part of a common network (e.g., a basic service set). For example, an access point may provide certain functionality to facilitate communication between two stations that are associated with different sub-networks of the access point. Here, a given station may not have an Internet Protocol ("IP") address of the other station since they are connected to the same local area network. Hence, the access point may assist in the IP routing to send traffic from one of its stations to another one of its stations.

For example, to facilitate communication between the sub-networks, the access point may "bridge" the sub-networks transparently to the user at the MAC layer or at the transport layer. To bridge at the MAC layer, the access point may implement the proxy ARP feature in which case the access point may change the BSSID, the source address, the destination address, the receiver address and the frame check sequence in the MAC header frame. In this way, a station on a first sub-network may reach a station on a second sub-network even though the stations are associated on two different BSSIDs. If the access point runs DHCP, the IP address assigned on each network may come from the same address pool and use the same network mask. To bridge at the transport layer, the access point may assign two different network domains on each network and route IP between them at the IP layer.

In view of the above, it may be appreciated that various advantages may be achieved in accordance with the teachings herein. For example, the standby time of a wireless local area network ("WLAN") device such as a phone may be increased by classifying broadcast and multicast traffic, providing sub-networks, and providing longer sleep periods. Here, the wake frequency of the WLAN device may be decreased (e.g., via longer DTIM intervals, beacon intervals, or both) and the amount of time spent processing traffic during the wake period may be reduced (e.g., by eliminating the processing of unwanted traffic).

The teachings herein are applicable to a variety of protocols, user devices and associated network components. Accordingly, a user device may incorporate various components to obtain connectivity to a network via various wireless platforms such as Wi-Fi (802.11-based), WiMAX, or any other suitable wireless platform. In addition, it should be appreciated that various forms of traffic may be classified into two or more different types of traffic in accordance with the teachings herein. Moreover, this may be accomplished through the use of various architectures, protocols, specifications, or standards in addition to or other than those that have been specifically described.

In some aspects the teachings herein may be incorporated into a user device that supports multiple communication protocols. For example, a mobile device may be implemented as a multifunctional device providing, for example, email, Internet access, as well as traditional cellular communication. Such a device may be equipped with wide area wireless connectivity, for example, utilizing the following technologies: third generation wireless or cellular systems (3G), WiMAX (e.g., 802.16), or other Wireless Wide Area Network (WWAN) technologies. In addition as discussed above, a device may incorporate IEEE 802.11-based Wireless Local Area Network (WLAN) connectivity. Furthermore, a device may incorporate ultra-wideband (UWB) and/or Bluetooth-based Wireless Personal Area Network (WPAN) local connectivity.

In general, WWAN technologies are distinguished by wide area (ubiquitous) coverage and wide area deployments. However, they can suffer from building penetration losses, coverage holes and comparatively, to WLAN and WPAN, limited bandwidth. WLAN and WPAN technologies deliver very high data rates, approaching hundreds of Mbps, but coverage is typically limited to hundreds of feet in the case of WLAN and tens of feet in the case of WPAN.

A variety of networks and protocols have been defined in an attempt to provide appropriate functionality to meet the various demands of users and applications. Such disparate networks and protocols may be laborious for a user to switch between and, in many cases, the user is trapped in a network without regard to what might be the optimal network for the user at a given time. Accordingly, in some aspects a user device may be adapted to provide seamless transitions between networks and/or protocols for optimizing and converging on the best communication protocol for a user.

Referring again to FIG. 1, the system 100 may incorporate a WLAN associated with a wired local area network (LAN). As discussed above, the access device 102 may comprise an access point that may be in communication with one or more user devices 104 (e.g., 802.11 mobile stations) configured to support WLAN connectivity. The access point may connect via a wired interface (e.g., as represented by link 106) to an Ethernet hub or switch for the wired LAN (not shown). The Ethernet hub also may be connected to one or more electronic devices (not shown) that may include personal computers, peripheral devices (e.g., facsimile machines, copiers, printers, scanners, etc.), servers, and the like. The Ethernet hub also may be connected to a router that transmits data packets to a modem (not shown). For certain types of uplink traffic, the modem may transmit data packets to a wide area network (WAN), such as the Internet. For certain types of downlink traffic, the network may buffer traffic for a mobile device and deliver the traffic synchronously to the mobile device. The system 100 illustrates a single, relatively simple network configuration. It should be appreciated, however, that many additional configurations of the system 100, including alternative user devices, are possible. Although the system 100 has been illustrated and described with reference to a LAN, it is possible that the system 100 may utilize other technologies including WWAN and/or WPAN either separately or concurrently.

The system 100 may enable a mobile device (e.g., user device 104) to seamlessly switch between an access point currently being utilized by the mobile device to the access point 102 associated with the system 100. A transfer to the access point 102 and to the network supported by the access point 102 may be desirable to provide the user of the mobile device a sought after functionality. Such a transfer may thus be a function of the location of the mobile device and/or the data the user desires to access or upload to the mobile device. By way of example and not limitation, the mobile device may be coupled to one or more of the electronic devices connected to the Ethernet hub to utilize the WWAN and/or WLAN functionality available through the electronic device(s). Such a transition can be user initiated or performed autonomously by the system 100.

It should be appreciated that the teachings herein may be employed in a variety of systems, architectures, and networks. For example, the networks and sub-networks described herein may comprise a Wi-Fi network (e.g., any 802.11-based network), a WiMAX network, or any other suitable network technology.

Figure 8:
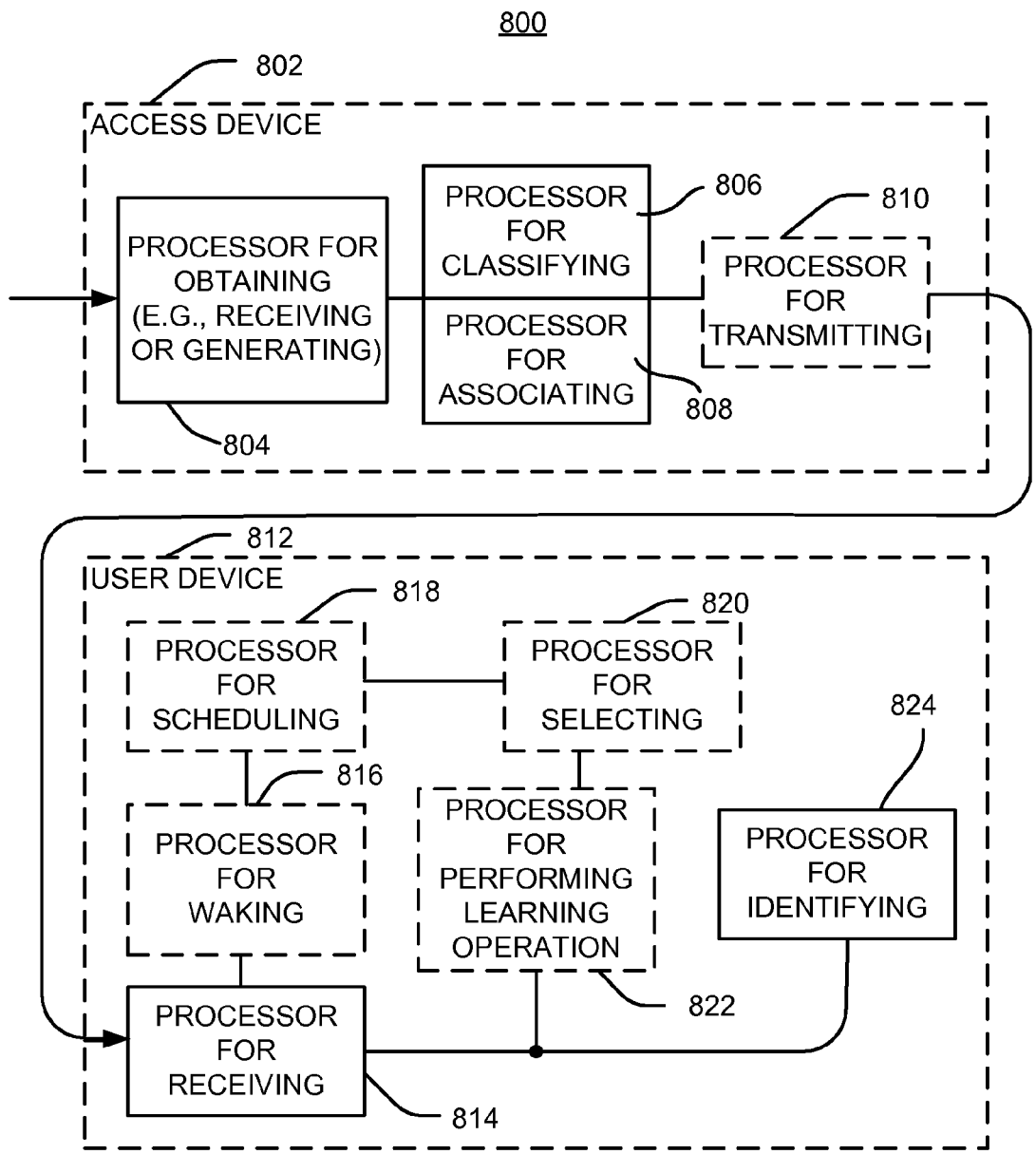
FIG. 8 is a simplified block diagram of several sample aspects of a communication system where broadcast or multicast traffic classified into different types of traffic is provided over multiple sub-networks.

Similarly, any of the components described herein may be implemented in a variety of ways. For example, referring to FIG. 8, a system 800 includes components 804, 806, 808, and 810 that may correspond to, for example, previously discussed components 308, 302, 306, and 310, respectively. In some aspects these components may be incorporated in a component 802 that may correspond to, for example, component 300 in FIG. 3. In addition, the system 800 includes components 814, 816, 818, 820, 822, and 824 that may correspond to, for example, previously discussed components 402, 406, 424, 404, 432, and 412, respectively. In some aspects these components may be incorporated in a component 812 that may correspond to, for example, component 400 in FIG. 4. FIG. 8 illustrates that in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

In addition, the components and functions represented by FIG. 8, as well as other components and functions described herein, may be implemented using any suitable means. Such means also may be implemented, at least in part, using corresponding structure as taught herein. For example, in some aspects means for transmitting may comprise a transmitter, means for receiving may comprise a receiver, means for obtaining may comprise a receiver, means for scheduling may comprise a scheduler, means for selecting may comprise a selector, means for classifying may comprise a classifier, means for associating may comprise a scheduler, means for waking may comprise a state controller, means for identifying may comprise an identifier, and means for performing learning operations may comprise a learning module. One or more of such means also may be implemented in accordance with one or more of the processor components of FIG. 8.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method operable by a user device of receiving broadcast or multicast traffic, comprising:
    identifying at least one of a plurality of different wireless sub-networks from which traffic is to be received, wherein the plurality of different wireless sub-networks are associated with a common network, wherein the traffic is communicable between the plurality of different wireless sub-networks, and wherein the user device is operable to receive the traffic from at least two of the plurality of different wireless sub-networks;
    receiving via a first wireless sub-network of the plurality of different wireless sub-networks, a first traffic type of a plurality of different types of broadcast or multicast traffic; and
    receiving via a second wireless sub-network of the plurality of different wireless sub-networks, a second traffic type of the plurality of the different types of broadcast or multicast traffic, wherein the first traffic type of the different types of broadcast or multicast traffic comprises user plane traffic, and the second traffic type of the plurality of the different types of broadcast or multicast traffic comprises control plane traffic;
    wherein a transmission schedule is different for the first traffic type of the different types of broadcast or multicast traffic via the first wireless sub-network than for the second traffic type of the plurality of the different types of broadcast or multicast traffic via the second wireless sub-network, and wherein the first traffic type of the different types of broadcast or multicast traffic is received at a different time than the second traffic type of the plurality of different types of broadcast or multicast traffic; waking from a power save state, at a time interval defined by the transmission schedule associated with the first wireless sub-network, to receive traffic via the first wireless sub-network; and waking from a power save state, at a time interval defined by the transmission schedule associated with the second wireless sub-network, to receive traffic via the second wireless sub-network; wherein the time interval defined by the transmission schedule associated with the second wireless sub-network is different than the time interval defined by the transmission schedule associated with the first wireless sub-network.

2. The method of claim 1, wherein a single access point defines the different wireless sub-networks such that each wireless sub-network is associated with a unique basic service set identifier.

3. The method of claim 1, wherein receiving comprises:
    receiving, via the first wireless sub-network, a first subset of the different types of broadcast or multicast traffic; and
    receiving, via the second wireless sub-network, a second subset of the different types of broadcast or multicast traffic.

4. The method of claim 1, wherein the control plane traffic relates to at least one of the group consisting of: connectivity, topology, path discovery, ARP, DHCP, presence, and paging.

5. The method of claim 1, wherein the user plane traffic comprises at least one of the group consisting of: streaming data, audio, and video.

6. The method of claim 1, wherein the first wireless sub-network and the second wireless sub-network are established by a common access point.

7. The method of claim 6, wherein receiving further comprises:
    receiving, at a first time interval, delivery traffic indication map (DTIM) beacons and associated broadcast or multicast traffic via the first wireless sub-network; and
    receiving, at a second time interval, delivery traffic indication map (DTIM) beacons and associated broadcast or multicast traffic via the second wireless sub-network;
    wherein the second time interval is longer than the first time interval.

8. The method of claim 1, wherein receiving further comprises receiving sub-network identifiers associated with the first traffic type and the second traffic type of the different types of broadcast or multicast traffic, wherein the sub-network identifiers indicate that the first traffic type and the second traffic type of the different types of broadcast or multicast traffic provide different front-ends to data service provided by the common network and provide at least one common broadcast or multicast traffic feed.

9. The method of claim 8, wherein the sub-network identifiers comprise service set identifiers (SSIDs).

10. The method of claim 1, wherein identifying comprises identifying one of the wireless sub-networks based on a list indicating which of the wireless sub-networks provide at least one common broadcast or multicast traffic feed.

11. The method of claim 1, wherein identifying comprises identifying the different types of broadcast or multicast traffic that may be received via the different wireless sub-networks.

12. The method of claim 1, wherein receiving comprises receiving traffic from an identified wireless sub-network by transitioning from a power save state to an active state according to a time interval defined by the transmission schedule associated with the identified wireless sub-network.

13. An apparatus for receiving broadcast or multicast traffic, comprising:
   an identifier configured to identify at least one of a plurality of different wireless sub-networks from which traffic is to be received, wherein the plurality of different wireless sub-networks are associated with a common network, wherein the traffic is communicable between the plurality of different wireless sub-networks, and wherein the user device is operable to receive the traffic from at least two of the plurality of different wireless sub-networks;
   a receiver configured to receive, via a first wireless sub-network of the plurality of different wireless sub-networks, a first traffic type of a plurality of different types of broadcast or multicast traffic; and
   the receiver further configured to receive, via a second wireless sub-network of the plurality of different wireless sub-networks, a second traffic type of the plurality of the different types of broadcast or multicast traffic, wherein the first traffic type of the different types of broadcast or multicast traffic comprises user plane traffic, and the second traffic type of the plurality of the different types of broadcast or multicast traffic comprises control plane traffic;
   wherein a transmission schedule is different for the first traffic type of the different types of broadcast or multicast traffic via the first wireless sub-network than for the second traffic type of the plurality of the different types of broadcast or multicast traffic via the second wireless sub-network, and wherein the of the different types of broadcast or multicast traffic is received at a different time than the second traffic type of the plurality of different types of broadcast or multicast traffic; wake the receiver from a power save state, at a time interval defined by the transmission schedule associated with the first wireless sub-network, to receive traffic via the first wireless sub-network; and wake the receiver from a power save state, at a time interval defined by the transmission schedule associated with the second wireless sub-network, to receive traffic via the second wireless sub-network; wherein the time interval defined by the transmission schedule associated with the second wireless sub-network is different than the time interval defined by the transmission schedule associated with the first wireless sub-network.

14. The apparatus of claim 13, wherein a single access point defines the different wireless sub-networks such that each wireless sub-network is associated with a unique basic service set identifier and the wireless sub-networks operate over a common wireless channel.

15. The apparatus of claim 13, wherein the receiver is further configured to:
   receive, via the first wireless sub-network, a first subset of the different types of broadcast or multicast traffic; and
   receive, via the second wireless sub-network, a second subset of the different types of broadcast or multicast traffic.

16. The apparatus of claim 13, wherein the control plane traffic relates to at least one of the group consisting of: connectivity, topology, path discovery, ARP, DHCP, presence, and paging.

17. The apparatus of claim 13, wherein the user plane traffic comprises at least one of the group consisting of: streaming data, audio, and video.

18. The apparatus of claim 13, wherein the receiver is further configured to:
   receive, at a first time interval, delivery traffic indication map (DTIM) beacons and associated broadcast or multicast traffic via the first wireless sub-network; and
   receive, at a second time interval, delivery traffic indication map (DTIM) beacons and associated broadcast or multicast traffic via the second wireless sub-network;
   wherein the second time interval is longer than the first time interval.

19. The apparatus of claim 13, wherein the receiver is further configured to receive sub-network identifiers associated with the first traffic type and the second traffic type of the different types of broadcast or multicast traffic, wherein the sub-network identifiers indicate that the first traffic type and the second traffic type of the different types of broadcast or multicast traffic provide different front-ends to data service provided by the common network and provide at least one common broadcast or multicast traffic feed.

20. The apparatus of claim 13, wherein the identifier is further configured to identify one of the wireless sub-networks based on a list indicating which of the wireless sub-networks provide at least one common broadcast or multicast traffic feed.

21. The apparatus of claim 13, further comprising a state controller configured to enable the receiver to receive the traffic from an identified wireless sub-network by transitioning the receiver from a power save state to an active state according to a time interval defined by the transmission schedule associated with the identified wireless sub-network.

22. An apparatus for receiving broadcast or multicast traffic, comprising:
   means for identifying at least one of a plurality of different wireless sub-networks from which traffic is to be received, wherein the plurality of different wireless sub-networks are associated with a common network, wherein the traffic is communicable between the plurality of different wireless sub-networks, and wherein the user device is operable to receive the traffic from at least two of the plurality of different wireless sub-networks;
   means for receiving via a first wireless sub-network of the plurality of different wireless sub-networks, a first traffic type of a plurality of different types of broadcast or multicast traffic; and
   means for receiving, by the user device, via a second wireless sub-network of the plurality of different wireless sub-networks, a second traffic type of the plurality of the different types of broadcast or multicast traffic, wherein the first traffic type of the different types of broadcast or multicast traffic comprises user plane traffic, and the second traffic type of the plurality of the different types of broadcast or multicast traffic comprises control plane traffic;
   wherein a transmission schedule is different for the first traffic type of the different types of broadcast or multicast traffic via the first wireless sub-network than for the second traffic type of the plurality of the different types of broadcast or multicast traffic via the second wireless sub-network; and
   wherein the first traffic type of broadcast or multicast traffic is received at a different time than the second traffic type of the plurality of different types of broadcast or multicast traffic; means for waking from a power save state: at a time interval defined by the transmission schedule associated with the first wireless sub-network, to receive traffic via the first wireless sub-network; and at a time interval defined by the transmission schedule associated with the second wireless sub-network, to receive traffic via the second wireless sub-network; wherein the time interval defined by the transmission schedule associated with the second wireless sub-network is different than the time interval defined by the transmission schedule associated with the first wireless sub-network.

23. The apparatus of claim 22, wherein a single access point defines the different wireless sub-networks such that each wireless sub-network is associated with a unique basic service set identifier and the wireless sub-networks operate over a common wireless channel.

24. The apparatus of claim 22, wherein the means for receiving receives:
via the first wireless sub-network, a first subset of the different types of broadcast or multicast traffic; and
via the second wireless sub-network, a second subset of the different types of broadcast or multicast traffic.

25. The apparatus of claim 22, wherein the control plane traffic relates to at least one of the group consisting of: connectivity, topology, path discovery, ARP, DHCP, presence, and paging.

26. The apparatus of claim 22, wherein the user plane traffic comprises at least one of the group consisting of: streaming data, audio, and video.

27. The apparatus of claim 22, wherein the means for receiving further receives:
at a first time interval, delivery traffic indication map (DTIM) beacons and associated broadcast or multicast traffic via the first wireless sub-network; and
at a second time interval, delivery traffic indication map (DTIM) beacons and associated broadcast or multicast traffic via the second wireless sub-network;
wherein the second time interval is longer than the first time interval.

28. The apparatus of claim 22, wherein the means for receiving further receives sub-network identifiers associated with the first traffic type and the second traffic type of the different types of broadcast or multicast traffic, wherein the sub-network identifiers indicate that the first traffic type and the second traffic type of the different types of broadcast or multicast traffic provide different front-ends to data service provided by the common network and provide at least one common broadcast or multicast traffic feed.

29. The apparatus of claim 22, wherein the means for identifying identifies one of the wireless sub-networks based on a list indicating which of the wireless sub-networks provide at least one common broadcast or multicast traffic feed.

30. The apparatus of claim 22, wherein the means for receiving receives traffic from an identified wireless sub-network by transitioning from a power save state to an active state according to a time interval defined by the transmission schedule associated with the identified wireless sub-network.

31. A computer program product for receiving broadcast or multicast traffic, comprising:
non-transitory computer-readable medium comprising code for causing at least one computer to:
identify at least one of a plurality of different wireless sub-networks from which traffic is to be received, wherein the plurality of different wireless sub-networks are associated with a common network, wherein the traffic is communicable between the plurality of different wireless sub-networks, and wherein the user device is operable to receive the traffic from at least two of the plurality of different wireless sub-networks;
receive via a first wireless sub-network of the plurality of different wireless sub-networks, a first traffic type of a plurality of different types of broadcast or multicast traffic; and
receive via a second wireless sub-network of the plurality of different wireless sub-networks, a second traffic type of the plurality of the different types of broadcast or multicast traffic, wherein the first traffic type of the different types of broadcast or multicast traffic comprises user plane traffic, and the second traffic type of the plurality of the different types of broadcast or multicast traffic comprises control plane traffic;
wherein a transmission schedule is different for the first traffic type of the different types of broadcast or multicast traffic via the first wireless sub-network than for the second traffic type of the plurality of the different types of broadcast or multicast traffic via the second wireless sub-network, and
wherein the first traffic type of the different types of broadcast or multicast traffic is received at a different time than the second traffic type of the plurality of different types of broadcast or multicast traffic; wake from a power save state, at a time interval defined by the transmission schedule associated with the first wireless sub-network, to receive traffic via the first wireless sub-network; and wake from a power save state, at a time interval defined by the transmission schedule associated with the second wireless sub-network, to receive traffic via the second wireless sub-network; wherein the time interval defined by the transmission schedule associated with the second wireless sub-network is different than the time interval defined by the transmission schedule associated with the first wireless sub-network.

32. The computer program product of claim 31, wherein a single access point defines the different wireless sub-networks such that each wireless sub-network is associated with a unique basic service set identifier and the wireless sub-networks operate over a common wireless channel.

33. The computer program product of claim 31, wherein the computer-readable medium further comprises code for causing the at least one computer to:
receive, via the first wireless sub-network, a first subset of the different types of broadcast or multicast traffic; and
receive, via the second wireless sub-network, a second subset of the different types of broadcast or multicast traffic.

34. The computer program product of claim 31, wherein the control plane traffic relates to at least one of the group consisting of: connectivity, topology, path discovery, ARP, DHCP, presence, and paging.

35. The computer program product of claim 31, wherein the user plane traffic comprises at least one of the group consisting of: streaming data, audio, and video.

36. The computer program product of claim 31, wherein the computer-readable medium further comprises code for causing the at least one computer to:
receive, at a first time interval, delivery traffic indication map (DTIM) beacons and associated broadcast or multicast traffic via the first wireless sub-network; and
receive, at a second time interval, delivery traffic indication map (DTIM) beacons and associated broadcast or multicast traffic via the second wireless sub-network;
wherein the second time interval is longer than the first time interval.

37. The computer program product of claim 31, wherein the computer-readable medium further comprises code for causing the at least one computer to receive sub-network identifiers associated with the first traffic type and the second traffic type of the different types of broadcast or multicast traffic, wherein the sub-network identifiers indicate that the first traffic type and the second traffic type of the different types of broadcast or multicast traffic provide different front-ends to data service provided by the common network and provide at least one common broadcast or multicast traffic feed.

38. The computer program product of claim 31, wherein the computer-readable medium further comprises code for causing the at least one computer to identify one of the wireless sub-networks based on a list indicating which of the wireless sub-networks provide at least one common broadcast or multicast traffic feed.

39. The computer program product of claim 31, wherein the computer-readable medium further comprises code for causing the at least one computer to receive the traffic from an identified wireless sub-network by transitioning from a power save state to an active state according to a time interval defined by the transmission schedule associated with the identified wireless sub-network.

40. A method operable by an access device of providing classified broadcast or multicast traffic, comprising:
obtaining broadcast or multicast traffic, from a common network;
classifying the broadcast or multicast traffic into different types of broadcast or multicast traffic;
associating the different types of broadcast or multicast traffic with different wireless sub-networks that are associated with the common network, wherein the traffic is communicable between the different wireless sub-networks, and wherein a user device is operable to receive the traffic from at least two of the different wireless sub-networks;
transmitting, via a first wireless sub-network of the different wireless sub-networks, a first traffic type of the different types of broadcast or multicast traffic at a first scheduled time; and
transmitting, via a second wireless sub-network of the different wireless sub-networks, a second traffic type of the different types of broadcast or multicast traffic at a second scheduled time, wherein the first scheduled time and the second scheduled time are different, wherein the first traffic type of the different types of broadcast or multicast traffic comprises user plane traffic, and the second traffic type comprises control plane traffic; transmitting, at a first time interval, the at least two of the different types of broadcast or multicast traffic via the first wireless sub-network; and transmitting, at a second time interval, the portion of the at least two of the different types of broadcast or multicast traffic via the second wireless sub-network; wherein the second time interval is different than the first time interval.

41. The method of claim 40, wherein a single access point defines the different wireless sub-networks such that each wireless sub-network is associated with a unique basic service set identifier and the wireless sub-networks operate over a common wireless channel.

42. The method of claim 40, further comprising:
transmitting, via the first wireless sub-network, a first subset of the different types of broadcast or multicast traffic; and
transmitting, via the second wireless sub-network, a second subset of the different types of broadcast or multicast traffic.

43. The method of claim 40, wherein the control plane traffic relates to at least one of the group consisting of: connectivity, topology, path discovery, ARP, DHCP, presence, and paging.

44. The method of claim 40, wherein the user plane traffic comprises at least one of the group consisting of: streaming data, audio, and video.

45. The method of claim 40, further comprising:
transmitting, at a first time interval, delivery traffic indication map (DTIM) beacons and associated broadcast or multicast traffic via the first wireless sub-network; and
transmitting, at a second time interval, delivery traffic indication map (DTIM) beacons and associated broadcast or multicast traffic via the second wireless sub-network;
wherein the second time interval is longer than the first time interval.

46. The method of claim 40, further comprising transmitting sub-network identifiers associated with the first traffic type and the second traffic type of the different types of broadcast or multicast traffic, wherein the sub-network identifiers indicate that the first traffic type and the second traffic type of the different types of broadcast or multicast traffic provide different front-ends to data service provided by the common network and provide at least one common broadcast or multicast traffic feed.

47. The method of claim 40, wherein the classifying is based on at least one of the group consisting of: a protocol type, a source port, a destination port, a source address, a destination address, a frequency of receipt of traffic, a type of service, and identification of an application associated with traffic.

48. An apparatus for providing classified broadcast or multicast traffic, comprising:
a receiver configured to obtain broadcast or multicast traffic, from a common network;
a classifier configured to classify the broadcast or multicast traffic into different types of broadcast or multicast traffic;
a traffic scheduler configured to associate the different types of broadcast or multicast traffic with different wireless sub-networks that are associated with the common network, wherein the traffic is communicable between the different wireless sub-networks, and wherein a user device is operable to receive the traffic from at least two of the different wireless sub-networks; and
a transmitter configured to:
transmit, via a first wireless sub-network of the different wireless sub-networks, a first traffic type of the different types of broadcast or multicast traffic at a first scheduled time; and
transmit, via a second wireless sub-network of the different wireless sub-networks, a second traffic type of the different types of broadcast or multicast traffic at a second scheduled time, wherein the first scheduled time and the second scheduled time are different, wherein the first traffic type of the different types of broadcast or multicast traffic comprises user plane traffic, and the second traffic type comprises control plane traffic; transmit, at a first time interval, the at least two of the different types of broadcast or multicast traffic via the first wireless sub-network; and transmit, at a second time interval, the portion of the at least two of the different types of broadcast or multicast traffic via the second wireless sub-network; wherein the second time interval is different than the first time interval.

49. The apparatus of claim 48, wherein:
the apparatus comprises a single access point; and
the traffic scheduler is further adapted to define the different wireless sub-networks such that each wireless sub-network is associated with a unique basic service set identifier and the wireless sub-networks operate over a common wireless channel.

50. The apparatus of claim 48, wherein the transmitter is further configured to:
   transmit, via the first wireless sub-network, a first subset of the different types of broadcast or multicast traffic; and
   transmit, via the second wireless sub-network, a second subset of the different types of broadcast or multicast traffic.

51. The apparatus of claim 48, wherein the control plane traffic relates to at least one of the group consisting of: connectivity, topology, path discovery, ARP, DHCP, presence, and paging.

52. The apparatus of claim 48, wherein the user plane traffic comprises at least one of the group consisting of: streaming data, audio, and video.

53. The apparatus of claim 48, wherein the classifier is further configured to classify based on at least one of the group consisting of: a protocol type, a source port, a destination port, a source address, a destination address, a frequency of receipt of traffic, a type of service, and identification of an application associated with traffic.

54. An apparatus for providing classified broadcast or multicast traffic, comprising:
   means for obtaining broadcast or multicast traffic, from a common network;
   means for classifying the broadcast or multicast traffic into different types of broadcast or multicast traffic;
   means for associating the different types of broadcast or multicast traffic with different wireless sub-networks that are associated with the common network, wherein the traffic is communicable between the different wireless sub-networks, and wherein a user device is operable to receive the traffic from at least two of the different wireless sub-networks; and
   means for transmitting:
      via a first wireless sub-network of the different wireless sub-networks, a first traffic type of the different types of broadcast or multicast traffic at a first scheduled time; and
      via a second wireless sub-network of the different wireless sub-networks, a second traffic type of the different types of broadcast or multicast traffic at a second scheduled time, wherein the first scheduled time and the second scheduled time are different, wherein the first traffic type of the different types of broadcast or multicast traffic comprises user plane traffic, and the second traffic type of the different types of broadcast or multicast traffic comprises control plane traffic;
      transmits: at a first time interval, the at least two of the different types of broadcast or multicast traffic via the first wireless sub-network; and at a second time interval, the portion of the at least two of the different types of broadcast or multicast traffic via the second wireless sub-network; wherein the second time interval is different than the first time interval.

55. The apparatus of claim 54, wherein:
   the apparatus comprises a single access point; and
   the means for associating defines the different wireless sub-networks such that each wireless sub-network is associated with a unique basic service set identifier and the wireless sub-networks operate over a common wireless channel.

56. The apparatus of claim 54, wherein the means for transmitting further comprise means for transmitting:
   via the first wireless sub-network, a first subset of the different types of broadcast or multicast traffic; and
   via the second wireless sub-network, a second subset of the different types of broadcast or multicast traffic.

57. The apparatus of claim 54, wherein the control plane traffic relates to at least one of the group consisting of: connectivity, topology, path discovery, ARP, DHCP, presence, and paging.

58. The apparatus of claim 54, wherein the user plane traffic comprises at least one of the group consisting of: streaming data, audio, and video.

59. The apparatus of claim 54, wherein the means for classifying classifies based on at least one of the group consisting of: a protocol type, a source port, a destination port, a source address, a destination address, a frequency of receipt of traffic, a type of service, and identification of an application associated with traffic.

60. A computer program product for providing classified broadcast or multicast traffic, comprising:
   non-transitory computer-readable medium comprising code for causing at least one computer to:
      obtain broadcast or multicast traffic, from a common network;
      classify the broadcast or multicast traffic into different types of broadcast or multicast traffic;
      associate the different types of broadcast or multicast traffic with different wireless sub-networks that are associated with the common network, wherein the traffic is communicable between the different wireless sub-networks, and wherein a user device is operable to receive the traffic from at least two of the different wireless sub-networks;
      transmit, via a first wireless sub-network of the different wireless sub-networks, a first traffic type of the different types of broadcast or multicast traffic at a first scheduled time; and
      transmit, via a second wireless sub-network of the different wireless sub-networks, a second traffic type of the different types of broadcast or multicast traffic at a second scheduled time, wherein the first scheduled time and the second scheduled time are different, wherein the first traffic type of the different types of broadcast or multicast traffic comprises user plane traffic, and the second traffic type of the different types of broadcast or multicast traffic comprises control plane traffic; transmit, at a first time interval, the at least two of the different types of broadcast or multicast traffic via the first wireless sub-network; and transmit, at a second time interval, the portion of the at least two of the different types of broadcast or multicast traffic via the second wireless sub-network; wherein the second time interval is different than the first time interval.

61. The computer program product of claim 60, wherein the computer-readable medium further comprises code for causing the at least one computer to define, by a single access point, the different wireless sub-networks such that each wireless sub-network is associated with a unique basic service set identifier and the wireless sub-networks operate over a common wireless channel.

62. The computer program product of claim 60, wherein the computer-readable medium further comprises code for causing the at least one computer to:
   transmit, via the first wireless sub-network, a first subset of the different types of broadcast or multicast traffic; and transmit, via the second wireless sub-network, a second subset of the different types of broadcast or multicast traffic.

63. The computer program product of claim 60, wherein the control plane traffic relates to at least one of the group consisting of: connectivity, topology, path discovery, ARP, DHCP, presence, and paging.

64. The computer program product of claim 60, wherein the user plane traffic comprises at least one of the group consisting of: streaming data, audio, and video.

65. The computer program product of claim 60, wherein the computer-readable medium further comprises code for causing the at least one computer to classify based on at least one of the group consisting of: a protocol type, a source port, a destination port, a source address, a destination address, a frequency of receipt of traffic, a type of service, and identification of an application associated with traffic.

* * * * *